US010315719B2

(12) United States Patent
Quade et al.

(10) Patent No.: US 10,315,719 B2
(45) Date of Patent: Jun. 11, 2019

(54) TWO-WHEELED VEHICLE

(71) Applicant: Indian Motorcycle International, LLC, Medina, MN (US)

(72) Inventors: Neil P. Quade, Buffalo, MN (US); Josh L. Edel, Belle Plaine, MN (US); John E. Feldman, Vadnais Heights, MN (US); Clark D. Davis, Forest Lake, MN (US); Steven F. Kruger, Forest Lake, MN (US); Matthew R. Gschwind, Saint Paul, MN (US)

(73) Assignee: Indian Motorcycle International, LLC, Medina, MN (US)

( * ) Notice: Subject to any disclaimer, the term of this patent is extended or adjusted under 35 U.S.C. 154(b) by 42 days.

(21) Appl. No.: 14/985,673

(22) Filed: Dec. 31, 2015

(65) Prior Publication Data
US 2017/0190373 A1  Jul. 6, 2017

(51) Int. Cl.
*B62J 99/00* (2009.01)
*B62J 7/06* (2006.01)
*B62J 35/00* (2006.01)
*B62K 11/04* (2006.01)
*B62K 11/14* (2006.01)

(52) U.S. Cl.
CPC .......... *B62J 99/00* (2013.01); *B62J 7/06* (2013.01); *B62J 35/00* (2013.01); *B62K 11/04* (2013.01); *B62K 11/14* (2013.01); *B62J 2099/0033* (2013.01)

(58) Field of Classification Search
CPC .... B62J 99/00; B62J 35/00; B62J 2099/0033; B62J 27/00; B62J 33/00; B62J 17/02; B62K 11/04; B62M 27/02; B60G 7/006

USPC ......................................................... 180/219
See application file for complete search history.

(56) References Cited

U.S. PATENT DOCUMENTS

| | | | |
|---|---|---|---|
| 5,513,107 A | 4/1996 | Gormley | |
| 6,343,237 B1 | 1/2002 | Rossow et al. | |
| 6,396,394 B1 | 5/2002 | Suzuki et al. | |
| 6,979,039 B2 * | 12/2005 | Takemura | B62J 17/04 296/78.1 |
| 7,317,386 B2 | 1/2008 | Lengning et al. | |

(Continued)

FOREIGN PATENT DOCUMENTS

| | | | |
|---|---|---|---|
| EP | 1081035 | 3/2001 | |
| EP | 1643262 | 4/2016 | |
| EP | 3067260 A1 * | 9/2016 | B62J 37/00 |

OTHER PUBLICATIONS

International Search Report and Written Opinion of the International Searching Authority, dated Apr. 6, 2017, for related International Patent Application No. PCT/US2016/068849; 14 pages.

(Continued)

*Primary Examiner* — Jacob D Knutson
(74) *Attorney, Agent, or Firm* — Faegre Baker Daniels LLP

(57) ABSTRACT

A vehicle has a longitudinal centerline and comprises a plurality of ground-engaging members, a seat supported by the plurality of ground-engaging members, a fuel tank positioned adjacent the seat, a steering assembly operably coupled to at least one the ground-engaging members, and a display movable with the steering assembly and intersecting the longitudinal centerline of the vehicle. The display is positioned rearward of a front plane of the fuel tank.

33 Claims, 24 Drawing Sheets

(56) References Cited

U.S. PATENT DOCUMENTS

| | | | | |
|---|---|---|---|---|
| 7,562,734 | B2* | 7/2009 | Yano | B62K 19/46 |
| | | | | 180/219 |
| 7,789,416 | B2* | 9/2010 | Horiuchi | B60R 21/2165 |
| | | | | 280/728.3 |
| 7,801,673 | B2* | 9/2010 | Suzuki | B62J 99/00 |
| | | | | 701/443 |
| 7,883,136 | B2 | 2/2011 | Tomolillo | |
| 8,596,400 | B2* | 12/2013 | Muroo | B62J 21/00 |
| | | | | 180/219 |
| 9,117,182 | B2 | 8/2015 | Bapna et al. | |
| 9,216,789 | B2* | 12/2015 | Hamlin | B62J 17/02 |
| 9,381,803 | B2* | 7/2016 | Galsworthy | B62J 17/04 |
| 2005/0121935 | A1* | 6/2005 | Bell | B62J 17/02 |
| | | | | 296/78.1 |
| 2006/0076175 | A1* | 4/2006 | Yamakura | B62K 25/283 |
| | | | | 180/219 |
| 2007/0035420 | A1* | 2/2007 | Yamada | B60R 11/02 |
| | | | | 341/50 |
| 2007/0085307 | A1* | 4/2007 | Horiuchi | B60R 21/233 |
| | | | | 280/730.1 |
| 2008/0054138 | A1* | 3/2008 | Ieda | B62K 5/01 |
| | | | | 248/214 |
| 2008/0156570 | A1 | 7/2008 | Minami | |
| 2010/0077807 | A1* | 4/2010 | Takeuchi | B60R 11/00 |
| | | | | 70/158 |
| 2010/0097325 | A1 | 4/2010 | Nagao et al. | |
| 2012/0259479 | A1* | 10/2012 | Yoneta | B62H 7/00 |
| | | | | 701/1 |
| 2013/0320697 | A1* | 12/2013 | Yokouchi | B62J 17/065 |
| | | | | 296/78.1 |
| 2014/0131128 | A1* | 5/2014 | Schuhmacher | B62J 17/04 |
| | | | | 180/219 |
| 2014/0188537 | A1 | 7/2014 | Primordial | |
| 2014/0225349 | A1* | 8/2014 | Kondrat | B62J 11/00 |
| | | | | 280/288.4 |
| 2014/0267987 | A1* | 9/2014 | Ouderkirk | G02F 1/133514 |
| | | | | 349/106 |
| 2015/0015019 | A1* | 1/2015 | Matsuoka | B62J 17/00 |
| | | | | 296/84.1 |
| 2015/0129342 | A1* | 5/2015 | O—Rourke | B62J 17/04 |
| | | | | 180/219 |
| 2015/0130209 | A1* | 5/2015 | Hamlin | B62J 17/02 |
| | | | | 296/78.1 |
| 2016/0052373 | A1* | 2/2016 | Hoshi | B60J 1/04 |
| | | | | 701/49 |
| 2016/0176467 | A1* | 6/2016 | Ishii | F02M 35/162 |
| | | | | 180/219 |
| 2017/0001674 | A1* | 1/2017 | Ishii | B62J 6/02 |

OTHER PUBLICATIONS

Harley-Davidson Motor Company, 2015 Boom! Box Owner's Manual, accessible at www.h-d.com/boom; 244 pages.
Harley-Davidson Motor Company, 2016 Boom! Box Owner's Manual, accessed on Jul. 10, 2015, www.h-d.com/boom; 248 pages.
Cycle World "2015 Indian Roadmaster-First Ride"; by Mark Hoyer, posed Jul. 27, 2014; accessible at www.cycleworld.com/2014/7/27/2015-indian-roadmaster-touring-motorcycle-review-first-ride-photos-specifications, 2 pages.
Indian Motorcycle, "Indian Motorcycle Announces the All-New Line of Indian Chief Motorcycles-Choice in American Motorcycles Is Here", posted Aug. 5, 2013, accessible at www.indianmotorcycle.com/en-us/story/08-05-13-indian-chief-motorcycles-launch; 7 pages.
Photograph of a front portion of an Indian Motorcycle, available at least as early as Aug. 5, 2013; 1 page.
International Preliminary Report on Patentability, issued by the European Patent Office, dated Mar. 12, 2018, for International Application No. PCT/US2016/068849, 17 pages.

* cited by examiner

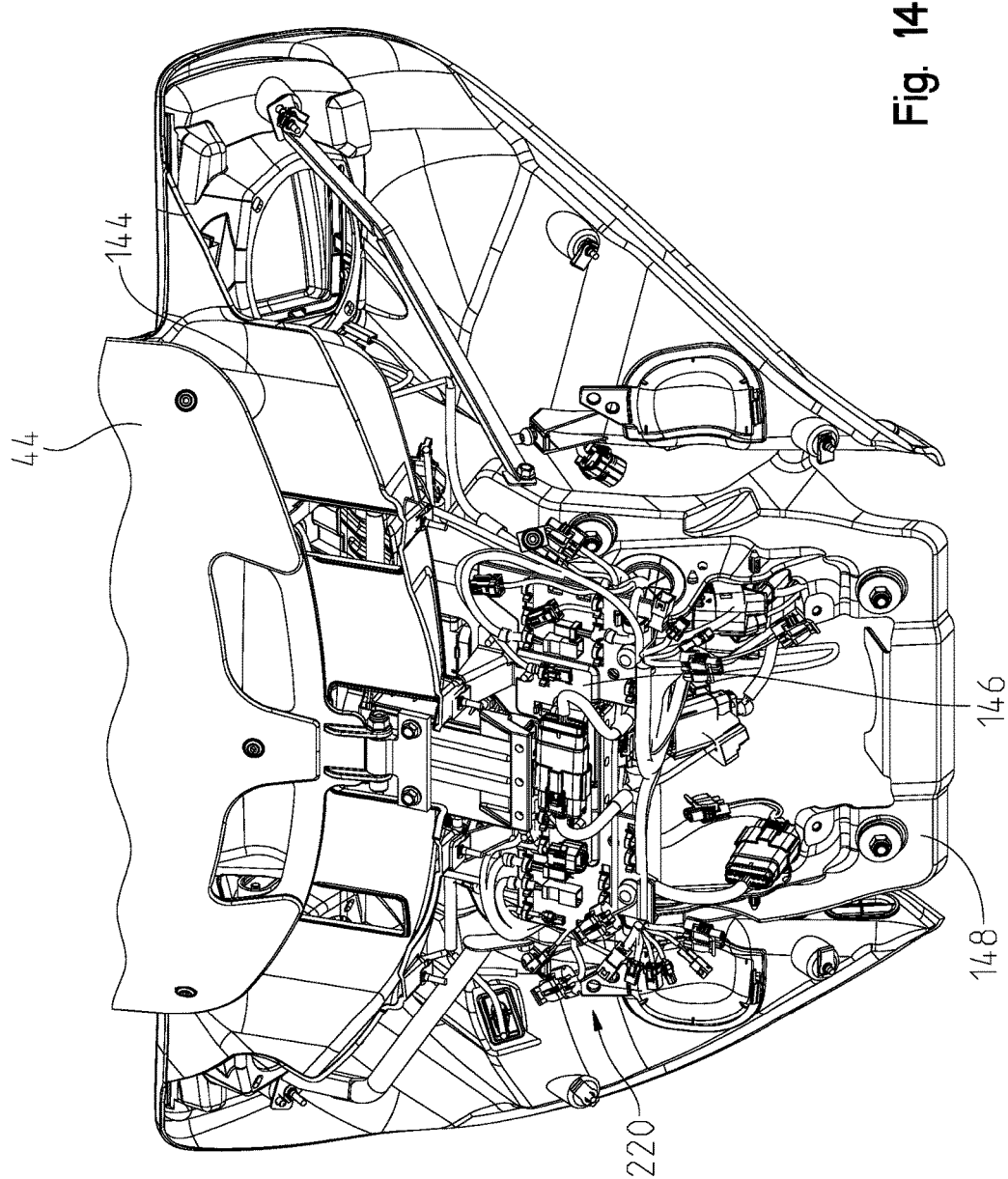

TWO-WHEELED VEHICLE

FIELD OF THE PRESENT DISCLOSURE

The present disclosure relates to a two-wheeled vehicle and, more particularly, to a two-wheeled vehicle having at least one display ergonomically positioned for the operator.

BACKGROUND OF THE PRESENT DISCLOSURE

Vehicles may include a display screen positioned forward of the operator to provide information about the vehicle, ambient conditions, or infotainment to the operator. However, if the display is a touch-screen display configured to receive an input from the operator, the operator may need to remove his/her hand from the steering device (e.g., steering wheel, handlebars) to contact the screen. Additionally, because the display is forward of the operator, the operator may need to lean forward to reach the display.

SUMMARY OF THE PRESENT DISCLOSURE

In an exemplary embodiment of the present disclosure, a vehicle has a longitudinal centerline and comprises a plurality of ground-engaging members, a seat supported by the plurality of ground-engaging members, a fuel tank positioned adjacent the seat, a steering assembly operably coupled to at least one the ground-engaging members, and a display movable with the steering assembly and intersecting the longitudinal centerline of the vehicle. The display is positioned rearward of a front plane of the fuel tank.

In a further exemplary embodiment of the present disclosure, an open-air vehicle has a longitudinal axis and comprises a plurality of ground-engaging members and a drivetrain assembly operably coupled to the plurality of ground-engaging members. The drivetrain assembly includes an engine having at least one cylinder. The vehicle also comprises a seat supported by the ground-engaging members and configured to support a rider, a steering assembly positioned longitudinally forward of the seat, and a dash assembly positioned adjacent a portion of the steering assembly. The dash assembly includes a display having a plurality of pixels configured to change in response to an input. The dash assembly also is configured to move with the steering assembly. Additionally, the display is vertically aligned with the at least one cylinder of the engine.

In yet another embodiment of the present invention, an open-air vehicle has a longitudinal axis and comprises a front ground-engaging member configured to rotate about a front axis of rotation and a rear ground-engaging member configured to rotate about a rear axis of rotation. A wheel base is defined between the front and rear axes of rotation. The vehicle further comprises a drivetrain assembly operably coupled to the plurality of ground-engaging members, a seat supported by the ground-engaging members and adapted to support a rider, a steering assembly positioned longitudinally forward of the seat, and a dash assembly positioned adjacent a portion of the steering assembly. The dash assembly includes a display having a plurality of pixels configured to change in response to an input. The dash assembly is configured to move with the steering assembly. A first longitudinal distance from a center of the seat to the display is at least 30% of the wheel base.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 14 is a left front view of a front portion of the vehicle of FIG. 1;

DETAILED DESCRIPTION OF THE DRAWINGS

Figure 1:
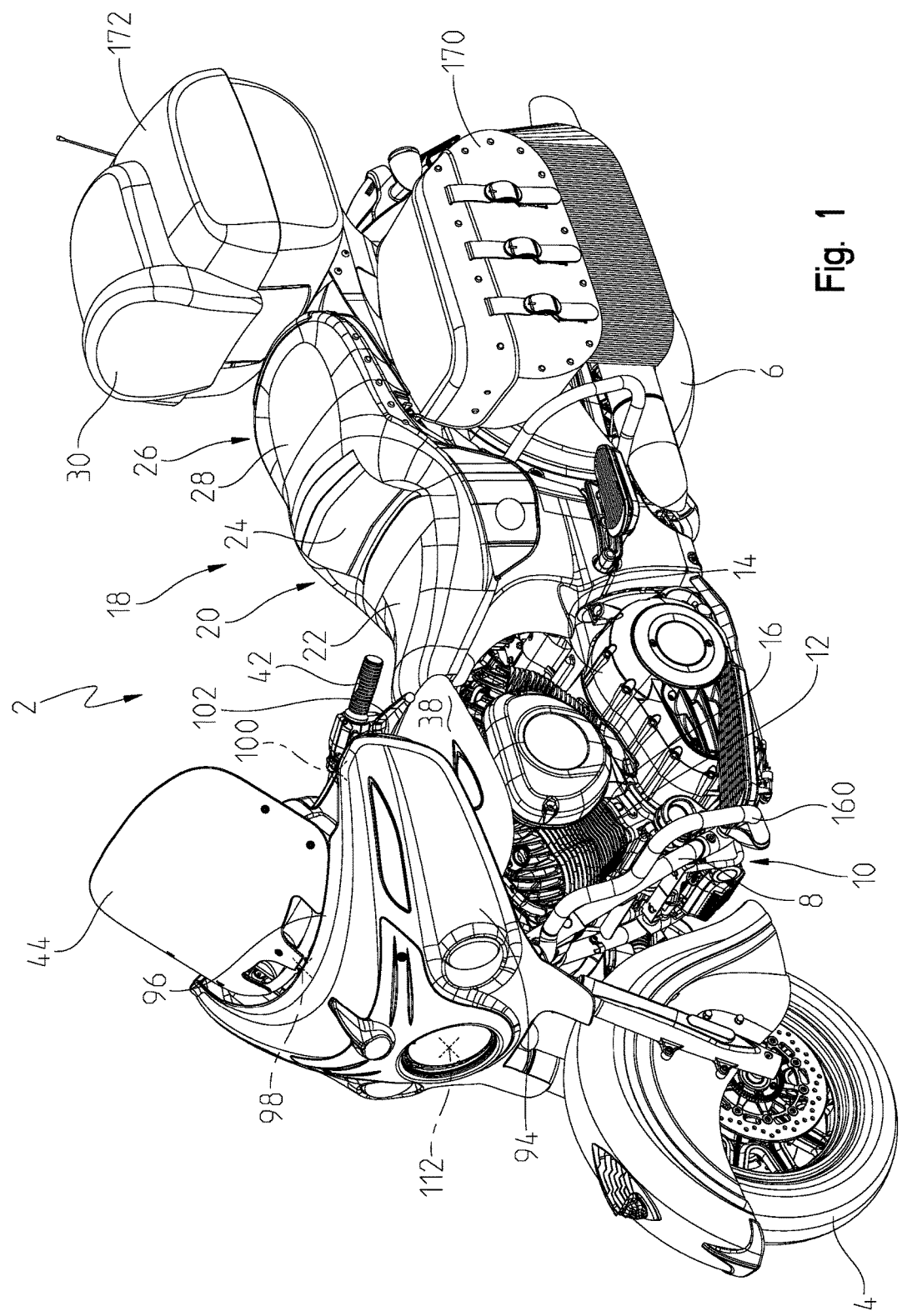
FIG. 1 is a left front perspective view of a vehicle of the present disclosure.

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a motorcycle, it should be understood, that the invention may have application to other types of vehicles such as all-terrain vehicles, snowmobiles, watercrafts, utility vehicles, scooters, golf carts, and mopeds.

With reference to FIGS. 1-7 and 13, an illustrative embodiment of a vehicle 2 is shown. Vehicle 2 is shown as a two-wheeled vehicle, such as a motorcycle, which includes a front ground-engaging member 4 with a front axis of rotation 5 (FIG. 3), a rear ground-engaging member 6 with a rear axis of rotation 7 (FIG. 13), a frame assembly 8 supported by ground-engaging members 4, 6 and extending longitudinally along a longitudinal axis L (FIG. 5), and a powertrain assembly 10 supported by frame assembly 8. Powertrain assembly 10 includes an engine 12 and a transmission 14. Transmission 14 may be a shiftable transmission or a continuously-variable transmission. Engine 12 is operably coupled to transmission 14 and includes at least one cylinder 16 and, illustratively, includes two cylinders 16. A fuel tank 38 is fluidly coupled to engine 12 and positioned generally above cylinders 16.

Figure 2:
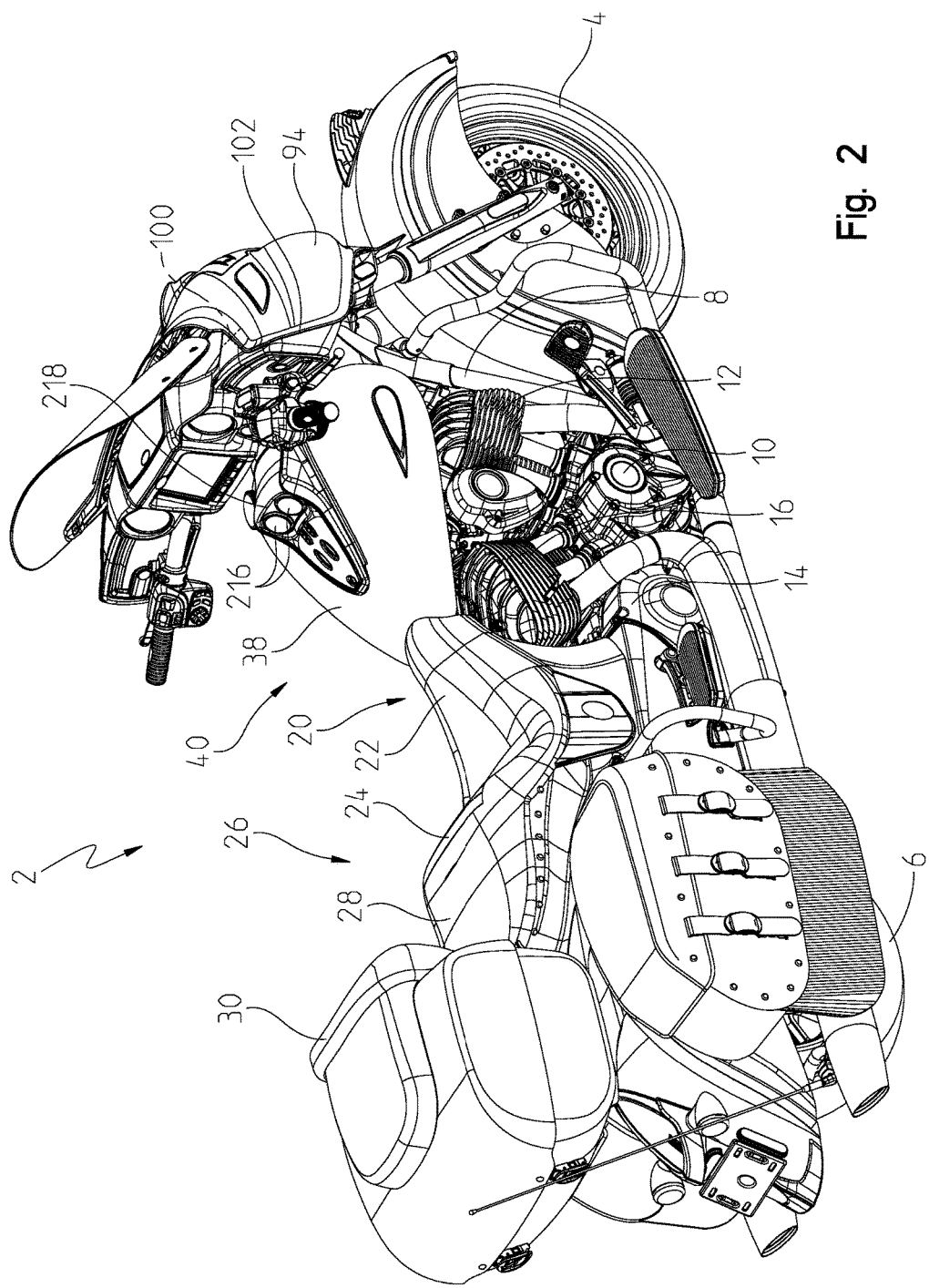
FIG. 2 is a right rear perspective view of vehicle of FIG. 1.
Figure 3:
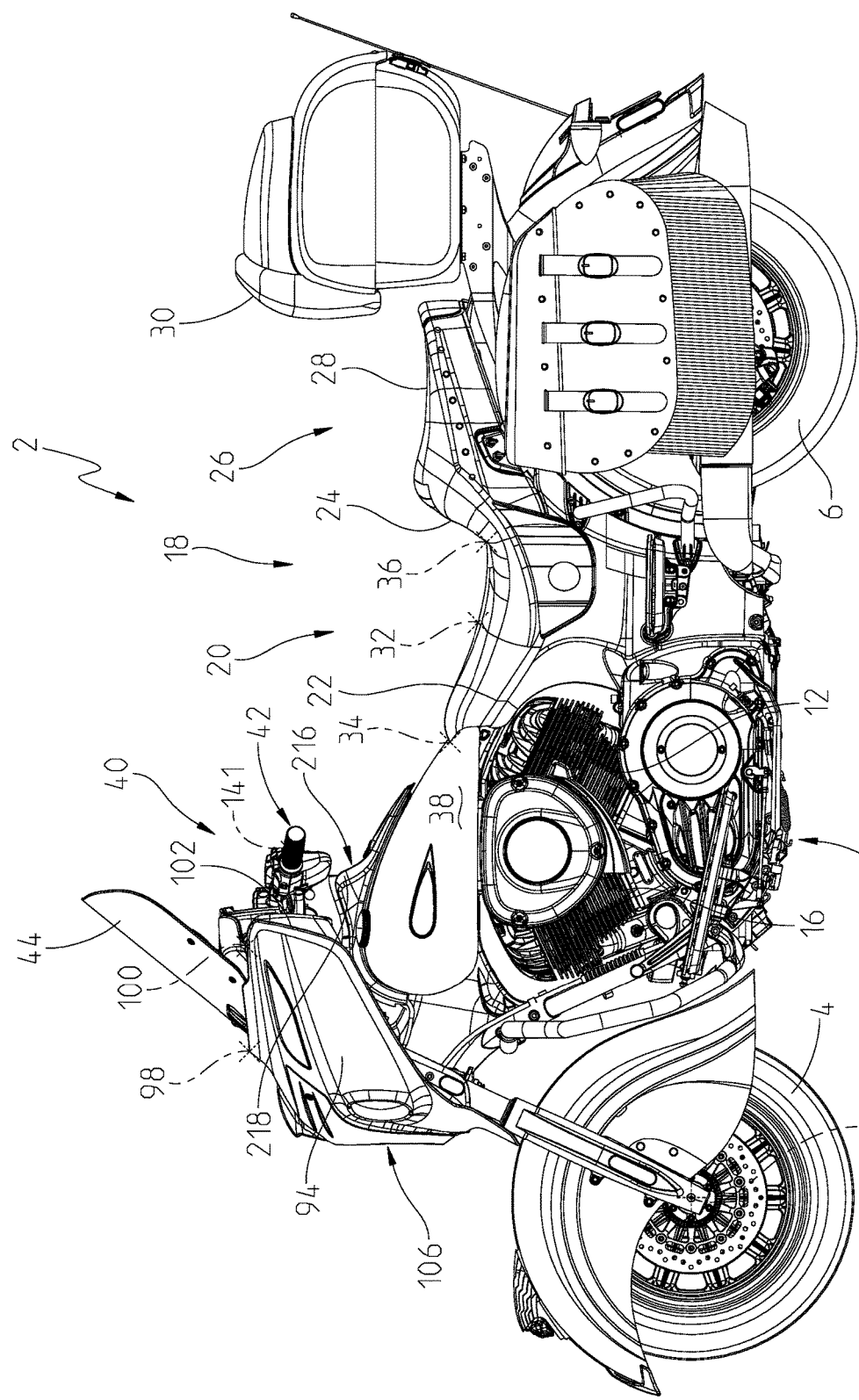
FIG. 3 is a left side view of the vehicle of FIG. 1.
Figure 4:
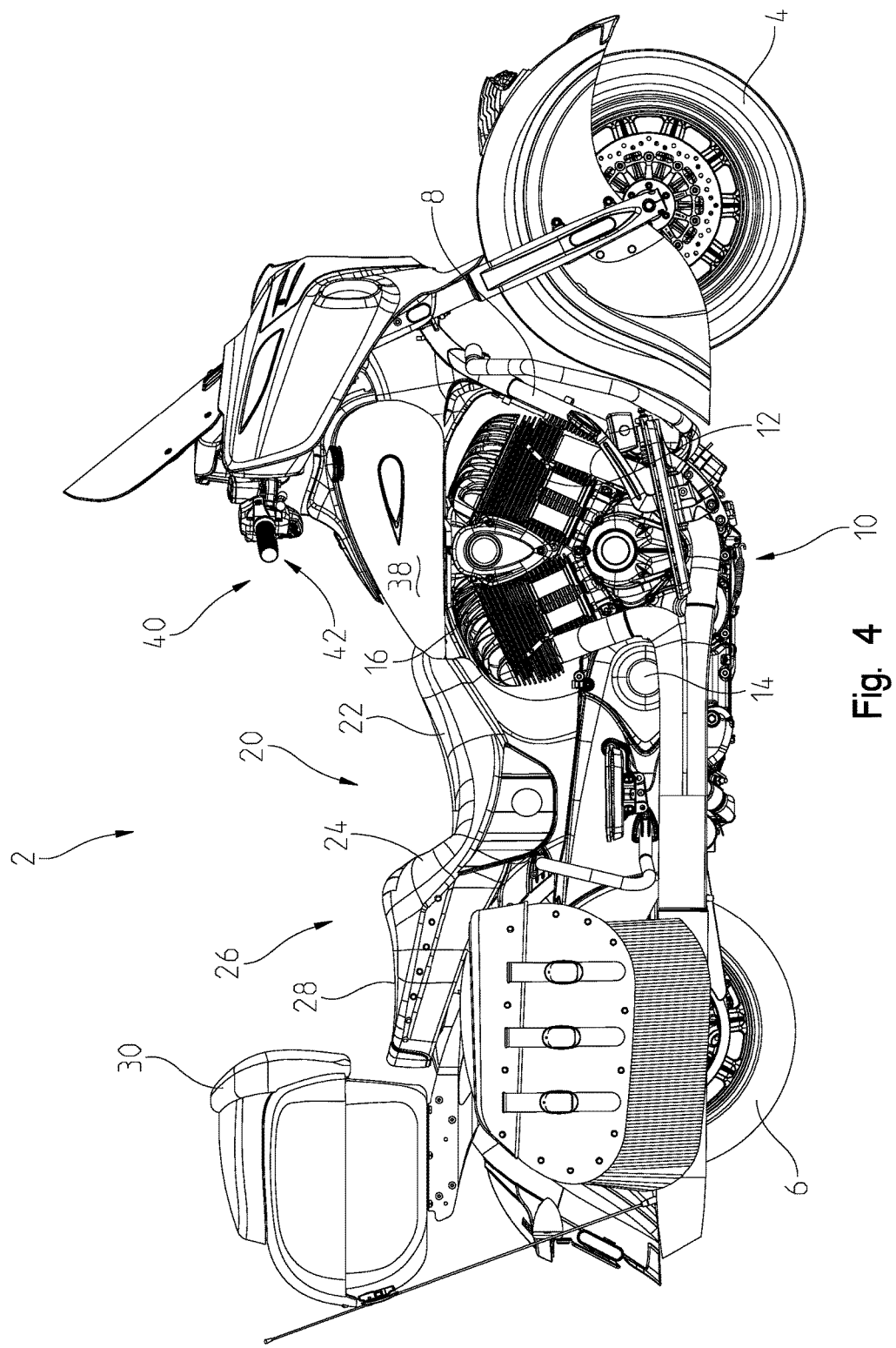
FIG. 4 is a right side view of the vehicle of FIG. 1.
Figure 5:
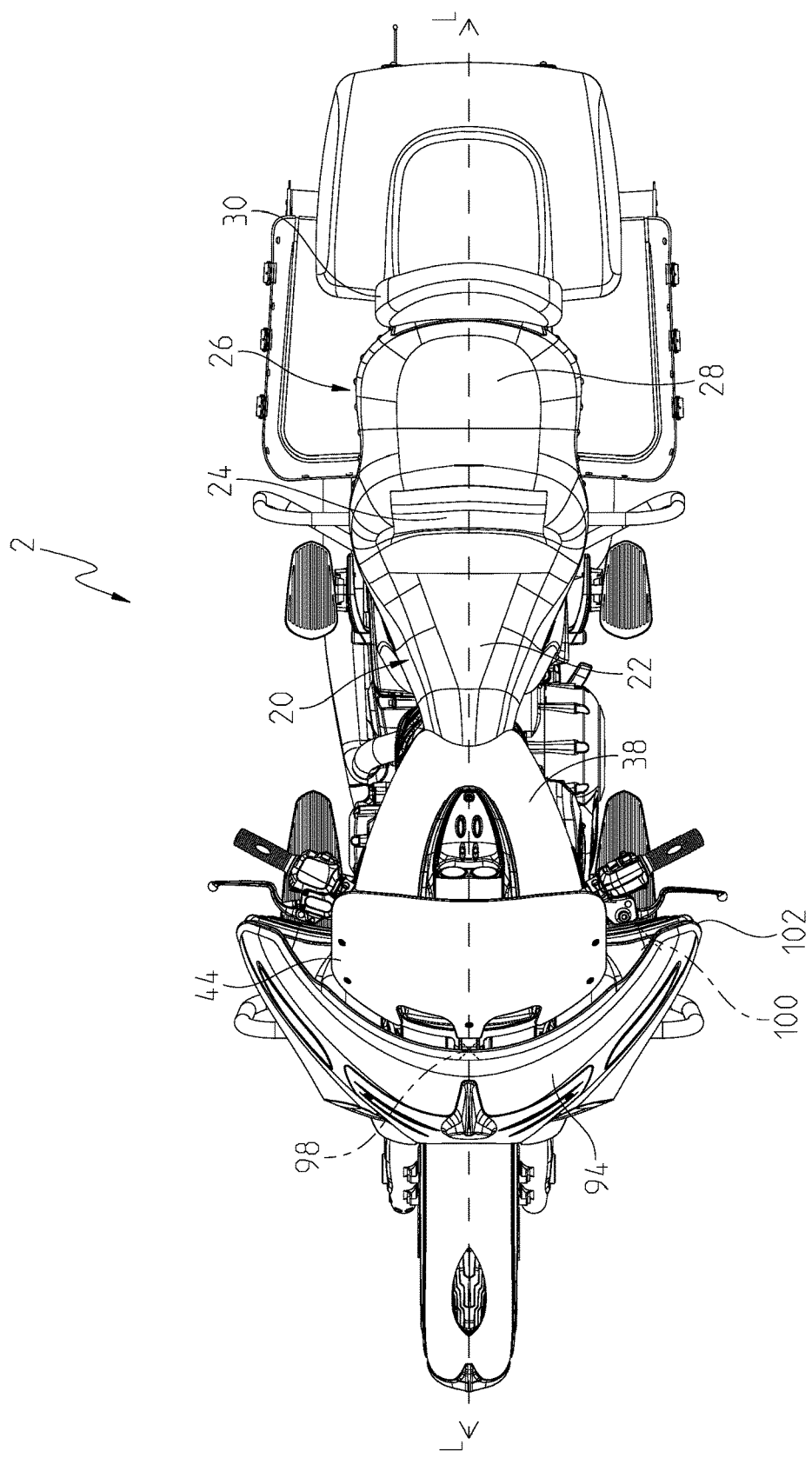
FIG. 5 is a top view of the vehicle of FIG. 1.

Referring to FIGS. 1-5, a seat assembly 18 is coupled to frame assembly 8 and is positioned generally above at least a portion of powertrain assembly 10. Seat assembly 18 includes an operator seat 20, defined by a seat bottom 22 and a seat back 24, and a passenger seat 26, defined by a seat bottom 28 and a seat back 30. Seat bottom 22 has a center point 32 positioned longitudinally between a front extent 34 and a rear extent 36 (FIG. 3) thereof. As shown in FIG. 3, front extent 34 of seat bottom 22 is adjacent a rear extent of fuel tank 38

Referring to FIGS. 1-6, 12, and 13, vehicle 2 includes an operator area 40 positioned generally forward of seat assembly 18 and rearward of at least a portion of a front fairing or body panel 94 of vehicle 2. Fairing 94 includes an upper extent defined by an upper lip 96. A center point 98 of upper lip 96 aligns with longitudinal axis L and the uppermost extent of upper lip 96 is defined at an upper extent 100 which is rearward and laterally outward of center point 98. Fairing 94 extends rearwardly to a rear extent 102 which is positioned generally above an upper extent of fuel tank 38.

Figure 16:
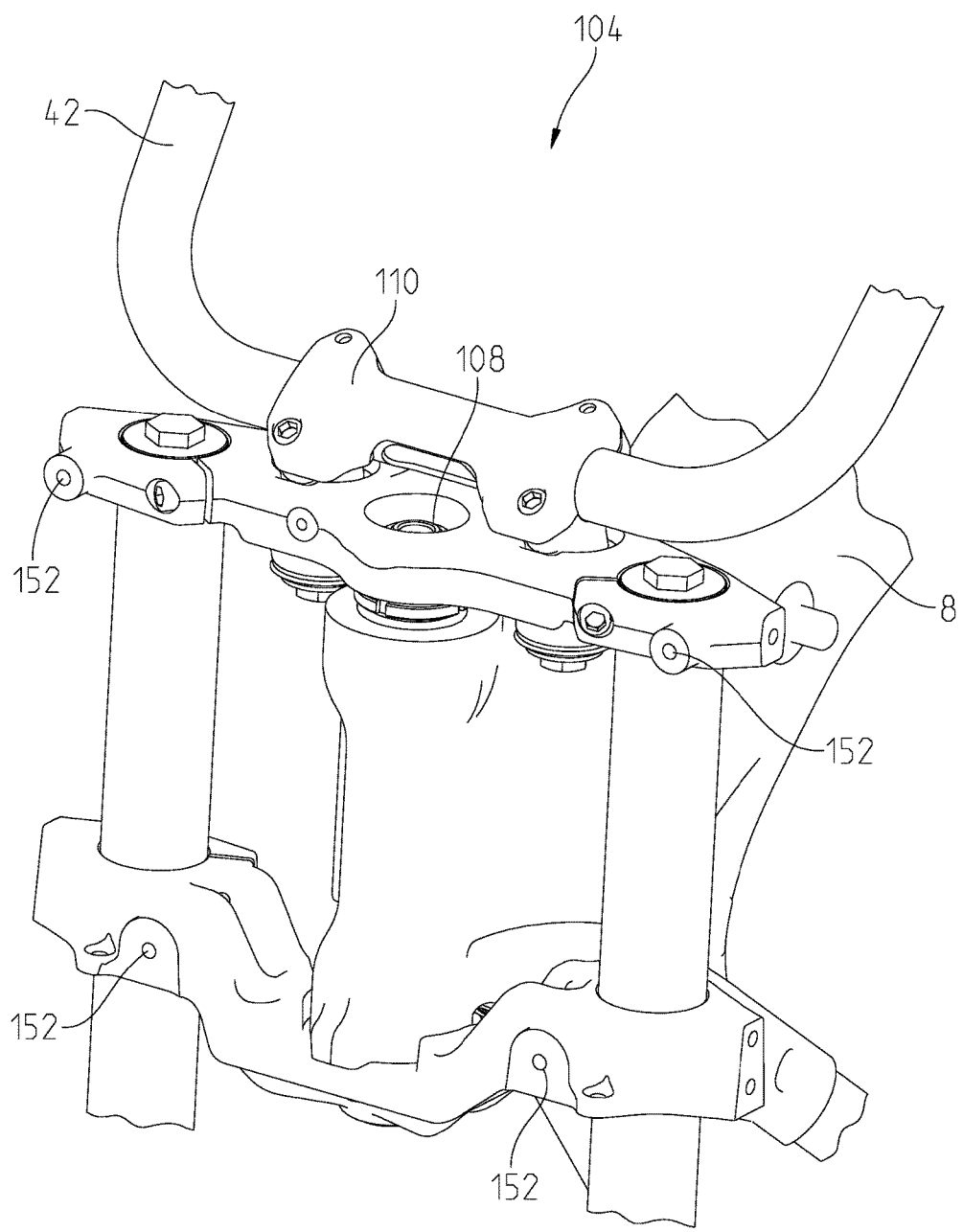
FIG. 16 is a left front perspective view of a triple clamp assembly configured to couple with the support bracket of FIGS. 15A and 15B.

Fairing 94 is coupled to a triple clamp assembly 104 of vehicle 2 (FIG. 16) and supports a headlight 106 (FIG. 6) forward of triple clamp assembly 104. Triple clamp assembly 104 is operably coupled to a portion of frame assembly 8 through a center coupler 108 and operably coupled to a steering assembly 42 through a bracket 110 (FIG. 16). Additional details of fairing 94 and triple clamp assembly 104 are disclosed in U.S. patent application Ser. No. 14/077,037, now issued as U.S. Pat. No. 9,216,789, the complete disclosure of which is expressly incorporated by reference herein.

As shown in FIGS. 8-13, operator area 40 includes steering assembly 42 with a gripping surface 140 with a mid-point (FIGS. 3 and 13), a windshield 44, and a dash assembly 46. Illustratively, steering assembly 42 defines handlebars having gripping surfaces 140 for the operator's hands. Alternatively, steering assembly 42 may be a steering wheel or any other steering device configured to turn vehicle 2. Additionally, in one embodiment, windshield 44 is configured to move between a raised position which shields the operator from at least some air/wind when vehicle 2 is moving and a lowered positioned in which may expose the operator to air/wind when vehicle 2 is moving.

Figure 8:
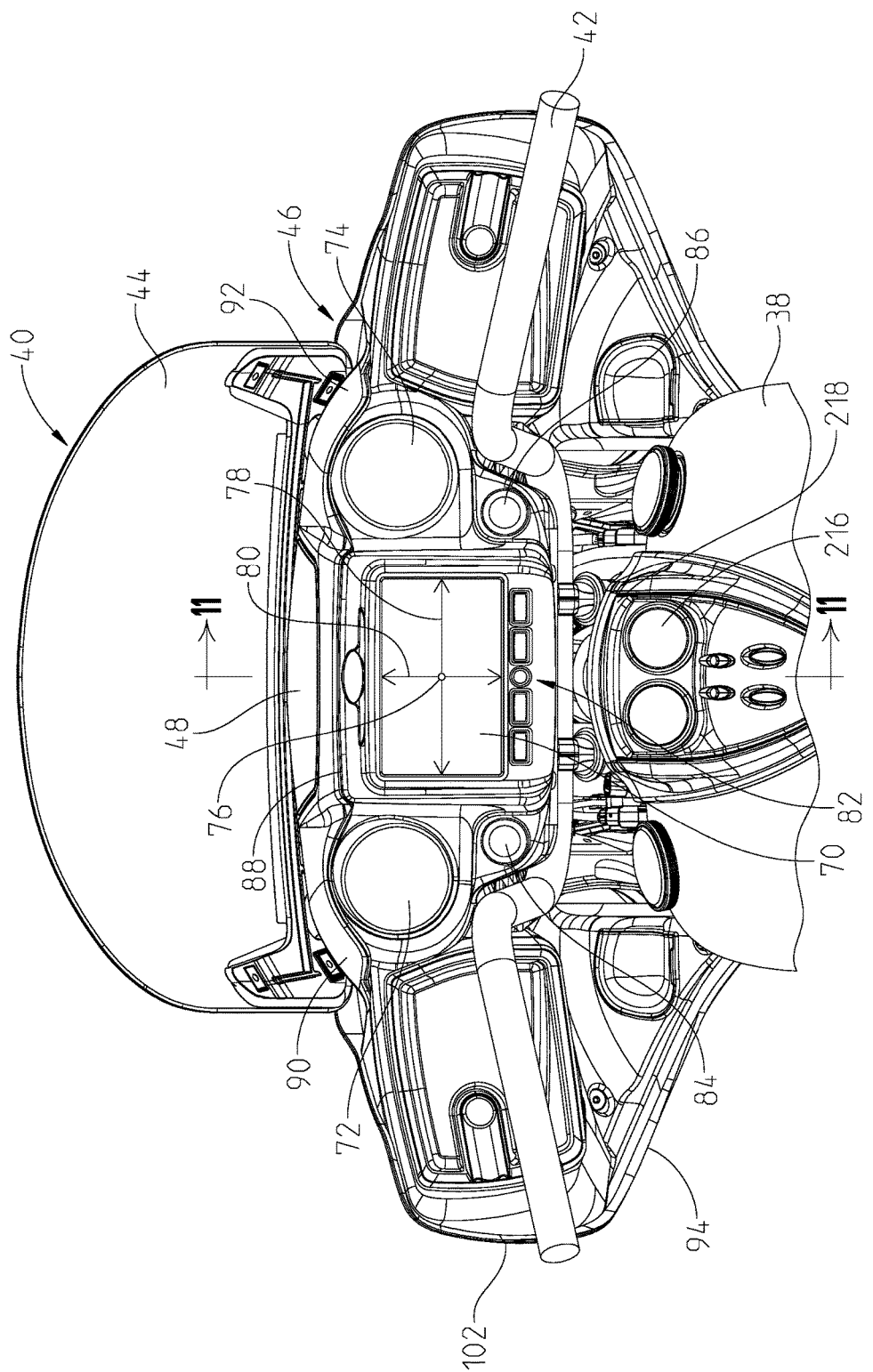
FIG. 8 is a rear view of an operator area of the vehicle of FIG. 1.

Referring now to FIGS. 8-13, dash assembly 46 of operator area 40 includes a storage area 48 in which an operator can put personal items during operation of vehicle 2. In one embodiment, storage area 48 is positioned at an upper surface of dash assembly 46 and is positioned adjacent a rear surface of windshield 44. Additionally, as shown in FIG. 8, storage area 48 is positioned forward of fuel tank 38. The position of storage area 48 provides the operator with easy access to storage area 48 during operation of vehicle 2. For example, the operator may reach forward to access storage area 48 without leaning forward on seat bottom 22 such that vehicle 2 maintains the same course when the operator accesses storage area 48.

Figure 9:
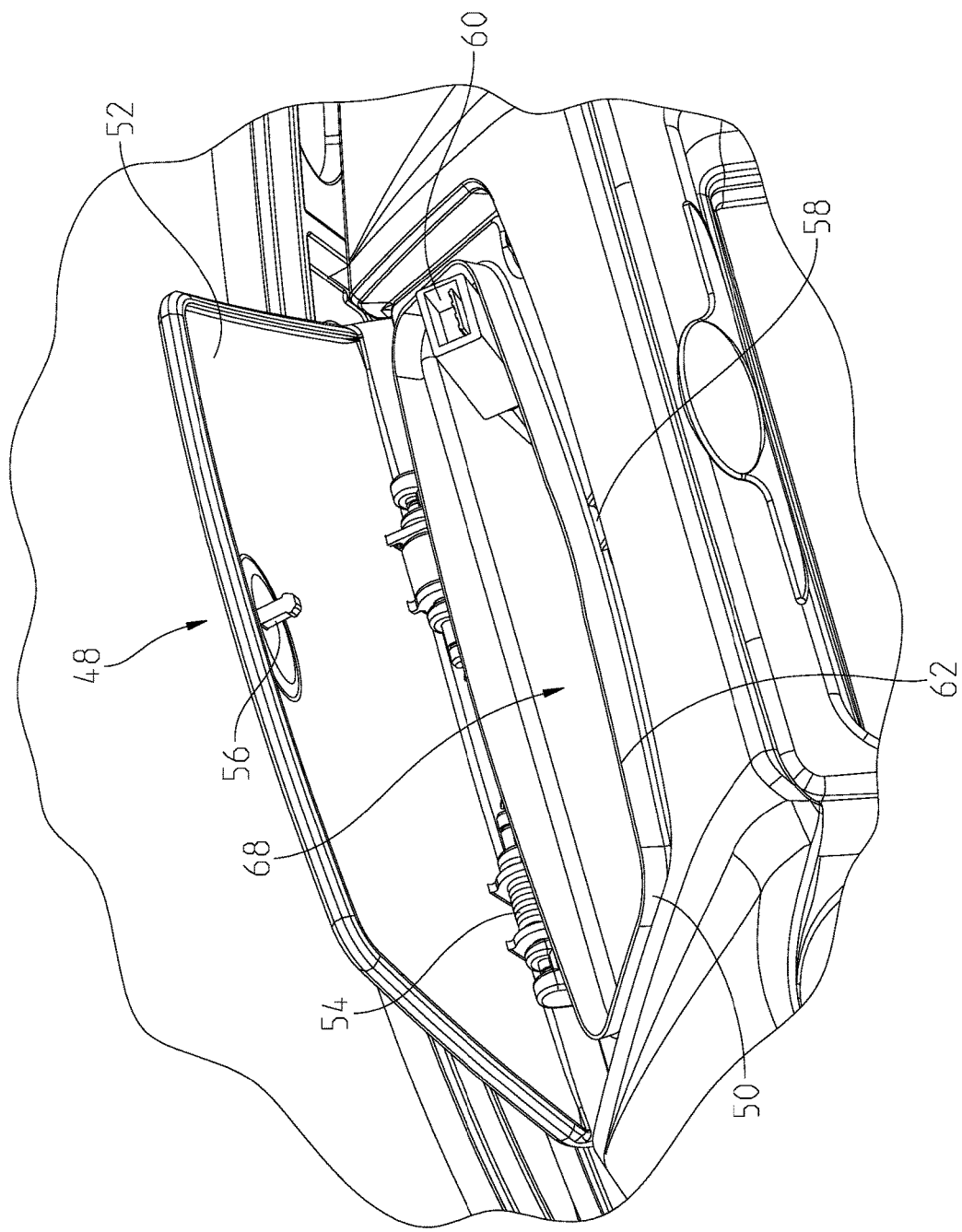
FIG. 9 is a left rear perspective view of a storage area of the operator area of FIG. 8.
Figure 10:
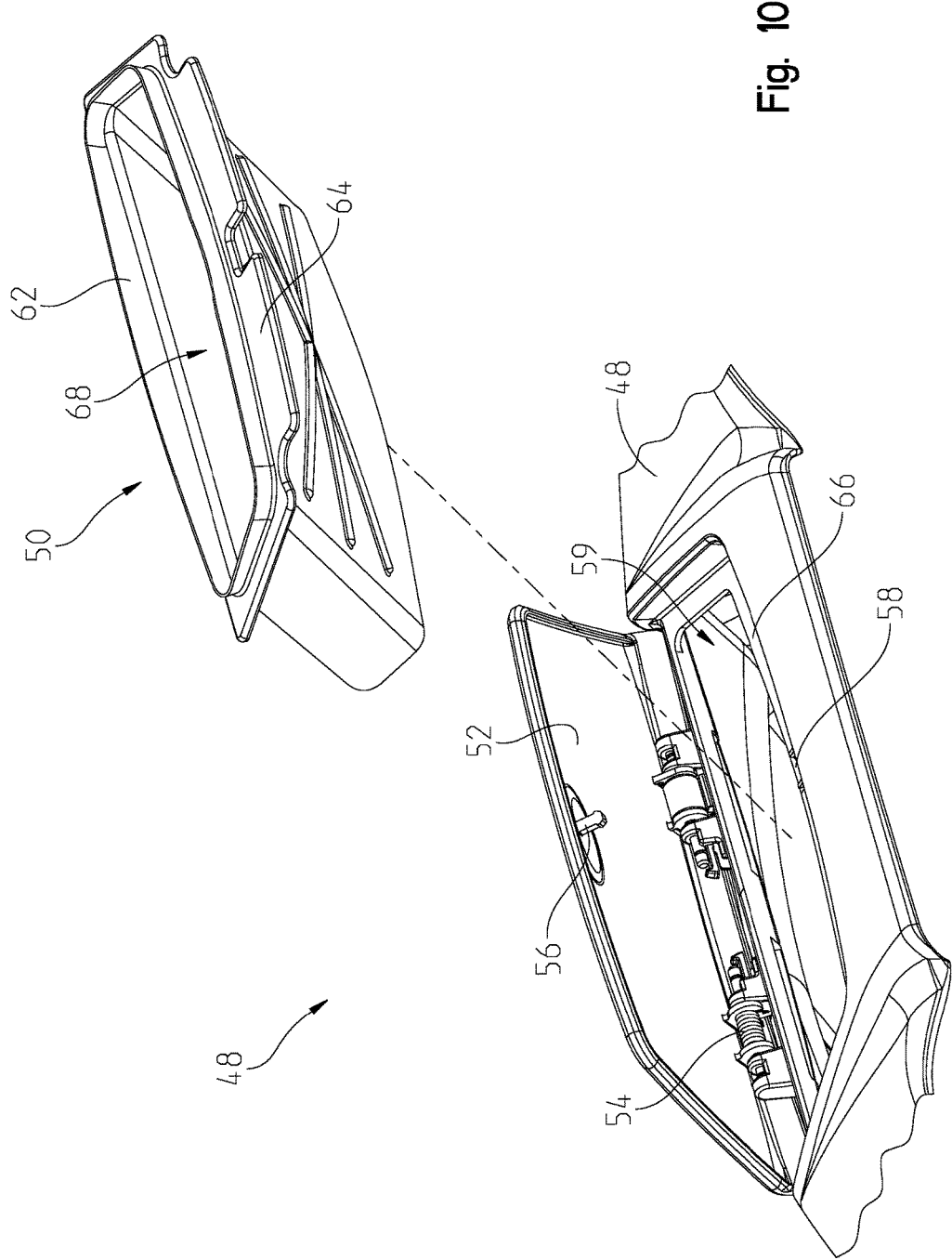
FIG. 10 is an exploded view of the storage area of FIG. 9.
Figure 11:
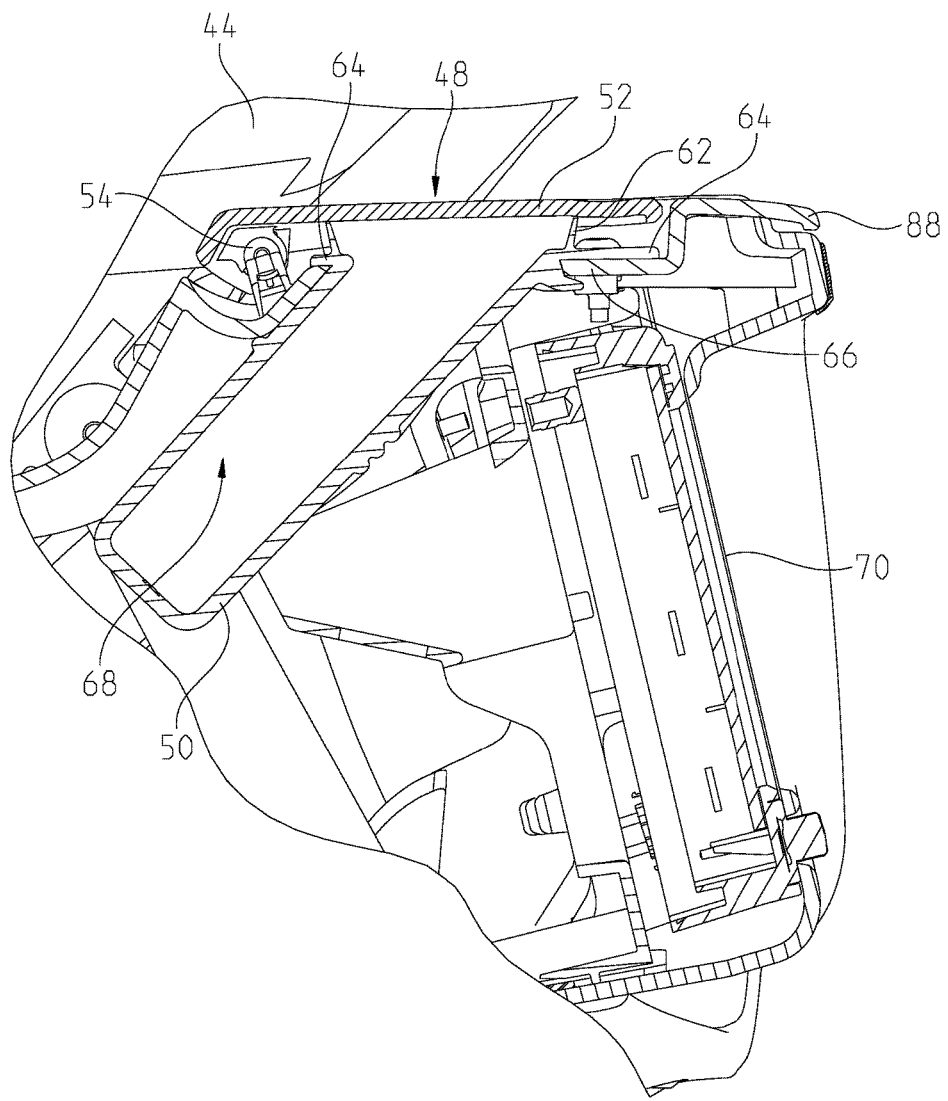
FIG. 11 is a cross-sectional view of the storage area of FIG. 8, taken along line 11-11 of FIG. 8.
Figure 12:
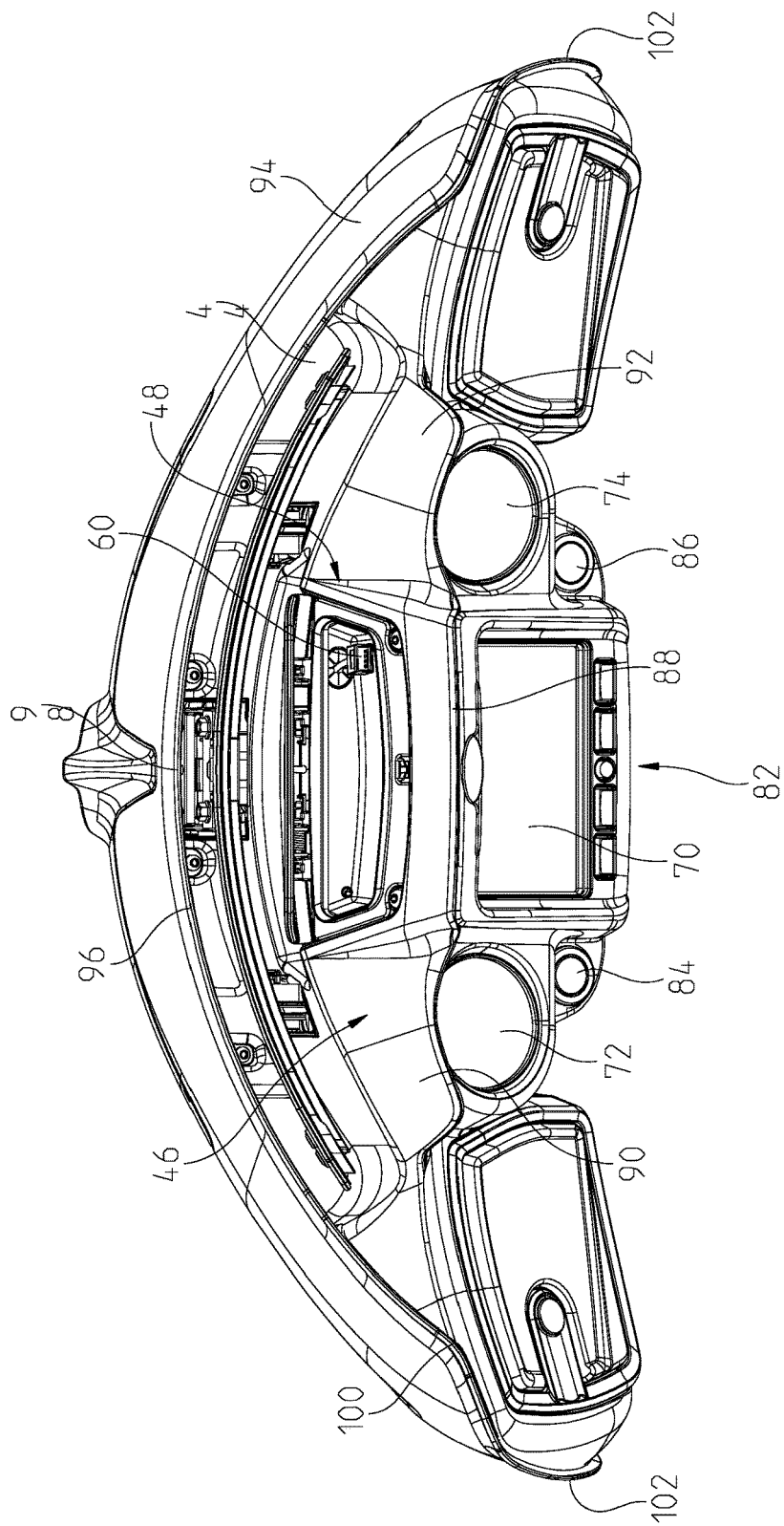
FIG. 12 is a top view of the operator area of FIG. 8.

Illustrative storage area 48 includes a storage container 50 removably positioned within an opening 59 of dash assembly 46. As shown in FIGS. 9 and 12, storage container 50 may include an electrical connector 60 (e.g., a USB port) for electrically connecting a device to an electrical system 220 (FIG. 14) of vehicle 2. In one embodiment, storage container 50 is comprised of a polymeric material and, more particularly, a flexible polymeric material (e.g., rubber or silicone) such that storage container 50 can be compressed or otherwise manipulated to pull storage container 50 from opening 59 and/or to put back within opening 59. Storage container 50 includes an upstanding lip 62 and a shoulder 64 for coupling with dash assembly 46. More particularly, as shown in FIG. 11, shoulder 64 receives a tab 66 of dash assembly 46 to couple storage container 50 to dash assembly 46. When storage container 50 is coupled to dash assembly 46, an internal volume 68 of storage container 50 is angled such that upstanding lip 62 is positioned rearward of internal volume 68. Additionally, lip 62 prevents water or other fluid from entering internal volume 68 of storage container 50.

Referring to FIGS. 8-12, storage area 48 also includes a lid 52 pivotably coupled to a portion of dash assembly 46 with hinges 54. Illustratively, hinges 54 are spring-loaded, however, hinges 54 may be any member configured to rotate lid 52 between a closed position (FIG. 8) and an open position (FIG. 9). When in the closed position of FIG. 8, lid 52 covers storage container 50 to conceal the items within internal volume 68 and is latched or otherwise coupled to dash assembly 46 with a latch member 56 extending from lid 52 which is received within a latch aperture 58 of dash assembly 46. In one embodiment, the operator may push down on lid 52 to release latch member 56 from latch aperture 58 and open lid 52. Additionally, to close lid 52, the operator may pivot lid 52 downwardly to insert latch member 56 into latch aperture 58.

Referring to FIGS. 8 and 11-13, dash assembly 46 also includes a plurality of visual indicators, including at least a first display or gauge 70, a second display or gauge 72, and a third display or gauge 74. In one embodiment, displays 70, 72, 74 may be movable or configured to tilt between upper and lower positions to accommodate the preferences of the operator. Illustratively, as shown in FIGS. 8 and 11, at least first display 70 is positioned rearward of and vertically below lid 52 of storage area 48. Additionally, as shown in FIG. 8, first display 70 is positioned intermediate second and third displays 72, 74 and is positioned along longitudinal axis L (FIG. 5) such that longitudinal axis L intersects a center point 76 of first display 70. First, second, and third displays 70, 72, 74 are configured to display various data or information about the operating conditions of vehicle 2, ambient conditions, infotainment (e.g., GPS, radio, wireless connectivity, Bluetooth® connectivity, audio settings), and/or any other information that may be useful to the operator during operation of vehicle 2.

In one embodiment, at least first display 70 is a touchscreen display with a plurality of pixels configured to change in response to an operator input. For example, the operator may use his/her finger to select options on first display 70 and receive information about vehicle 2, ambient conditions, etc. Additionally, dash assembly 46 may support a plurality of inputs 82 positioned adjacent first display 70 which also allow the operator to change the information presented on first display 70 and also access various features of vehicle 2 (e.g., a radio, GPS, Bluetooth®, a power or on/off input for displays 70, 72, 74, and other infotainment options). In one embodiment, inputs 82 are push buttons positioned along one side of first display 70.

Dash assembly 46 also may include additional inputs 84, 86 positioned outward from inputs 82 to control various functions of vehicle 2. For example, input 86 may be the power button for vehicle 2 such that input 86 turns vehicle 2 on and off. Additionally, input 84 may control the fog lights or other features of vehicle 2.

In one embodiment, first display 70 has a generally square cross-section defined by a width 78 and a height 80. Illustratively, width 78 may be approximately 5-7 inches, for example 6.2 inches, and height 80 may be approximately 3-5 inches, for example 3.8 inches. Second and third displays 72, 74 also may define a square in cross-section, however, illustrative first and second displays 72, 74 define a circle in cross-section.

Figure 6:
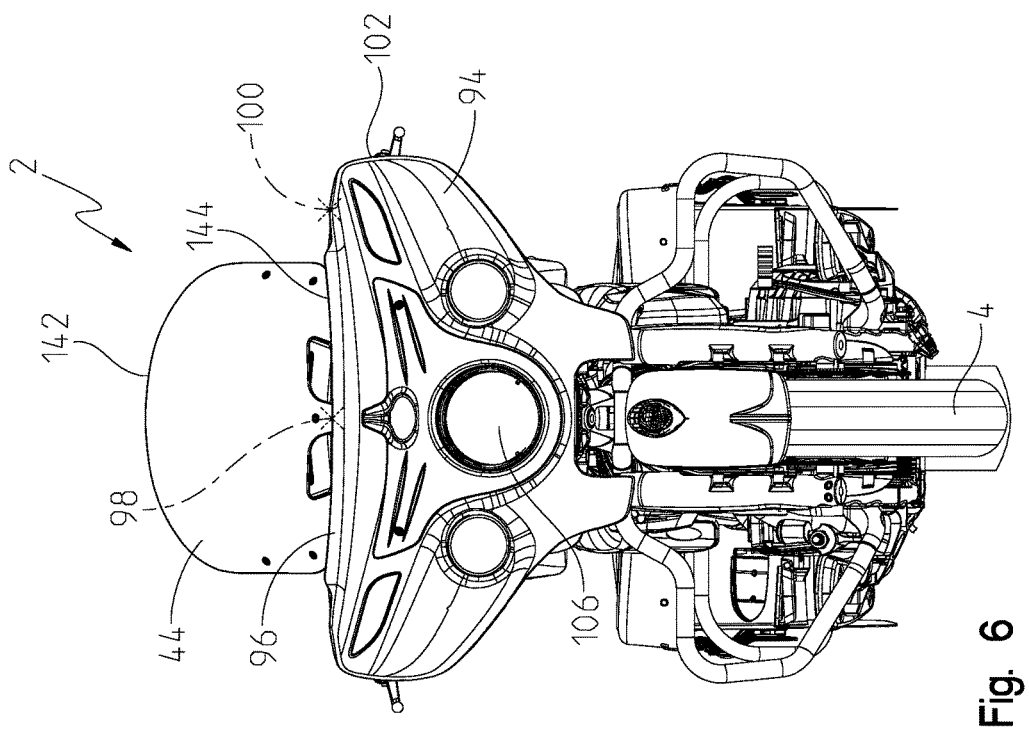
FIG. 6 is a front view of the vehicle of FIG. 1.

As shown in FIGS. 8, 11, 12, and 13, dash assembly 46 also may include a first visor 88 positioned directly above first display 70, a second visor 90 positioned directly above second display 72, and a third visor 92 positioned directly above third display 74 to decrease any glare on displays 70, 72, 74 when viewed by the operator. More particularly, visors 88, 90, 92 rearwardly overhang the upper extent of displays 70, 72, 74, respectively, such that displays 70, 72, 74 are shielded from sun or other glare to increase visibility of the information on displays 70, 72, 74 to the operator. As shown in FIG. 12, visors 88, 90, 92 define rearward extensions of the upper surface of dash assembly 46. As such, the upper surface of dash assembly 46 includes both lid 62 of storage area 48 and visors 88, 90, 92 for displays 70, 72, 74. Additionally, at least first visor 88 is positioned vertically intermediate an upper extent 142 and a lower extent 144 of windshield 44 (FIG. 6).

Fuel tank 38 also includes at least one display 216 configured to display fuel information to the operator. As with displays 70, 72, 74, display 216 on fuel tank 38 also may include a visor 218 which rearwardly overhangs the upper extent of display 216 to decrease glare on display 216 (FIGS. 2, 3, and 8).

Figure 13:
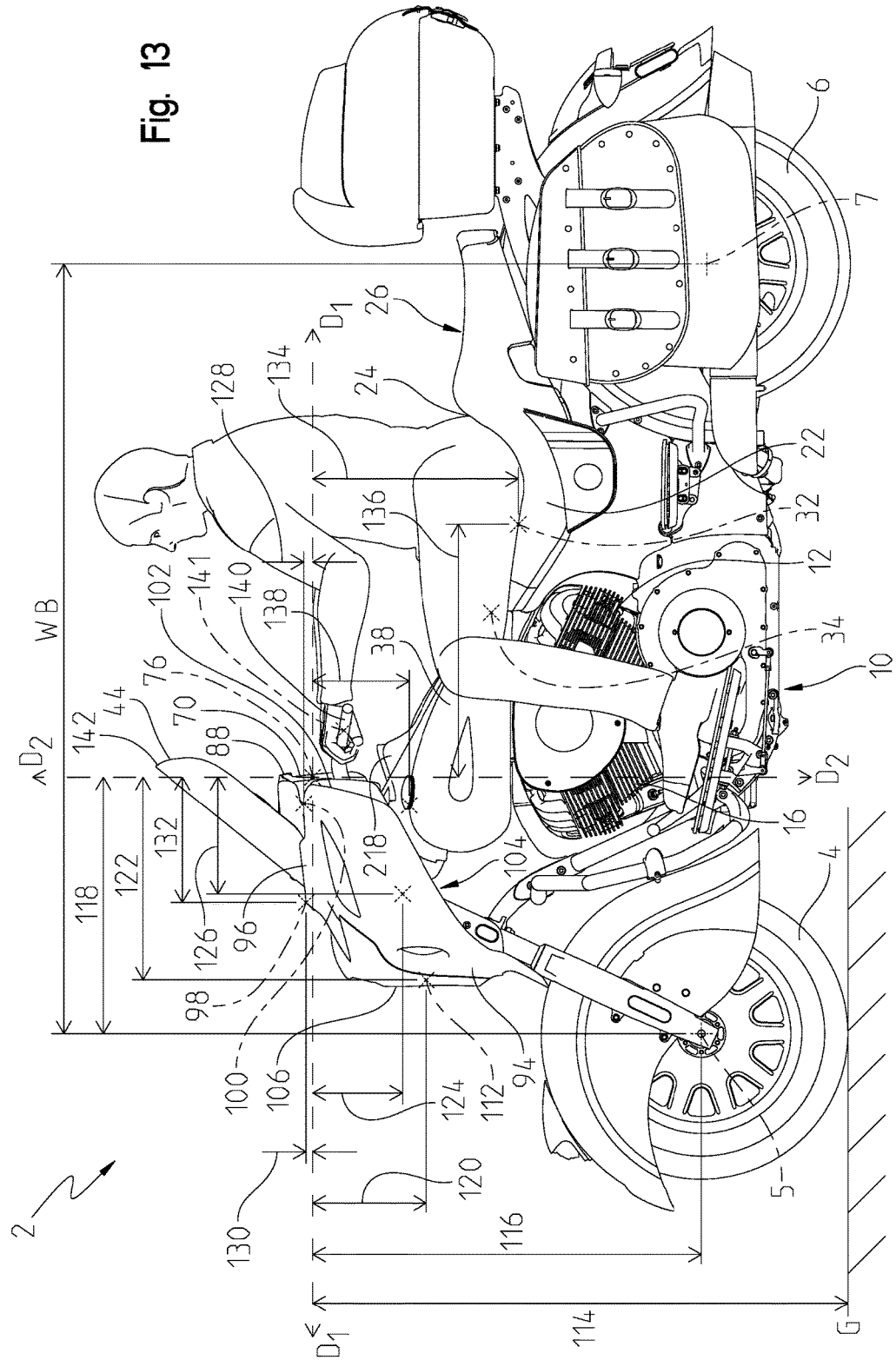
FIG. 13 is a side view of the vehicle of FIG. 1 with an operator positioned on the vehicle.

Referring to FIG. 13, displays 70, 72, 74 are ergonomically positioned on vehicle 2 such that the operator does not need to lean forward when accessing displays 70, 72, 74. More particularly, displays 70, 72, 74 are positioned to be within the length of the arm of an average male operator (i.e., a male with measurements in the $50^{th}$ percentile) such that the operator can access displays 70, 72, 74 without leaning forward from seat 20 (i.e., the operator's hips stay positioned on seat bottom 22 when accessing displays 70, 72, 74). For example, as shown in FIG. 13, center point 76 of first display 70 is positioned directly above one of cylinders 16 and, illustratively, rearward of a front extent of one of cylinders 16 of engine 12. Additionally, center point 76 of first display 70 is positioned above fuel tank 38 and, more particularly, rearward of a front extent or plane of fuel tank 38. Also, center point 76 of first display 70 may be approximately 20-30 inches longitudinally forward of front extent 34 of seat bottom 22 and, more particularly, approximately 23.0-24.0 inches longitudinally forward of front extent 34. First display 70 also is positioned rearward of rear extent 102 of fairing 94 and center point 76 of first display 70 is positioned above uppermost extent 100 of upper lip 96 of fairing 94. Further, in one embodiment, the lower extent of first display 70 is positioned vertically above triple clamp assembly 104. Additionally, gripping surface 140 of steering assembly 42 is positioned vertically intermediate the upper and lower extents of first display 70 such that the operator only needs to move his/her hand laterally inward to access first display 70. More particularly, mid-point 141 of gripping surface 140 (FIG. 3) is positioned rearward of first display 70 by approximately 8-11 inches, for example approximately 9.3-9.7 inches. By positioning first display 70 in these positional relationships relative to other components of vehicle 2, first display 70 is ergonomically positioned for the operator when he/she is seated on seat 22 such that the operator does not need to lean forward to access first display 70 when reaching for first display 70.

First display 70 also is positioned rearward of front axis of rotation 5 by at least 30% of a wheel base WB (FIG. 13) defined between axes of rotation 5, 7 of ground-engaging members 4, 6. For example, wheel base WB of vehicle 2 may be approximately 65 inches and the longitudinal distance between front axis of rotation 5 and center point 76 of first display 70 may be approximately 32% of wheel base WB. Alternatively, first display 70 may be positioned rearward of front axis of rotation 5 by as little as 5-29% of wheel base WB or as much as 31-85% of wheel base WB, or at any percentage between 5-85% of wheel base WB.

According to Table 1, in one example of vehicle 2, first display 70 is elevated to be nearer to the line of sight of the operator such that a horizontal plane $D_1$ extending through center point 76 of first display 70 is positioned vertically above various components of vehicle 2 and first display 70 is positioned rearwardly to be within the length of the operator's arm such that a vertical plane $D_2$ extending through center point 76 of first display 70 is positioned longitudinally rearward of various components of vehicle 2 to prevent the operator from leaning forward during operation of vehicle 2 to access first display 70 (FIG. 13):

TABLE 1

| | Distance (in.) of Plane $D_1$ Vertically Above: | Distance (in.) of Plane $D_2$ Rearward of: |
|---|---|---|
| Ground Surface G | 44.4 (Distance 114 (FIG. 13)) | N/A |
| Front Axis of Rotation 5 | 32.0 (Distance 116 (FIG. 13)) | 21.0 (Distance 118 (FIG. 13)) |
| Center Point 112 of Headlight 106 | 9.2 (Distance 120 (FIG. 13)) | 16.1 (Distance 122 (FIG. 13)) |
| Center Coupler 108 of Triple Clamp Assembly 104 | 6.5 (Distance 124 (FIG. 13)) | 9.4 (Distance 126 (FIG. 13)) |
| Upper Extent 100 of Fairing 94 | −1.9 (Distance 128 (FIG. 13)) | N/A |
| Center Point 98 of Upper Lip 96 of Fairing 94 | −1.7 (Distance 130 (FIG. 13)) | 9.7 (Distance 132 (FIG. 13)) |
| Center Point 32 of Seat Bottom 22 | 16.0 (Distance 134 (FIG. 13)) | −24.5 (Distance 136 (FIG. 13)) |
| Upper Extent of Fuel Tank 38 | 7.1 (Distance 138 (FIG. 13)) | N/A |

While one embodiment of vehicle 2 of FIG. 13 includes first display 70 at the positions disclosed in Table 1, it should be understand that the position of first display 70 may be adjusted, such that center point 76 of first display 70 may be approximately 42-46 inches from ground surface G, approximately 30-35 inches above and approximately 19-24 inches rearward of front axis of rotation 5, approximately 8-11 inches above and approximately 15-18 inches rearward of center point 112 of headlight 106, approximately 5-7 inches above and approximately 7-11 inches rearward of center coupler 108 of triple clamp assembly 104, approximately 0.1-4 inches below or approximately 0.1-2 inches above upper extent 100 of fairing 94, approximately 0.1-3 inches below or approximately 0.1-2.0 inches above center point 98 of fairing 94, approximately 8-12 inches rearward of center point 98 of fairing 94, approximately 14-19 inches above and approximately 22-35 inches forward of center point 32 of seat bottom 22, and approximately 5-9 inches above the upper extent of fuel tank 38.

Figure 15A:
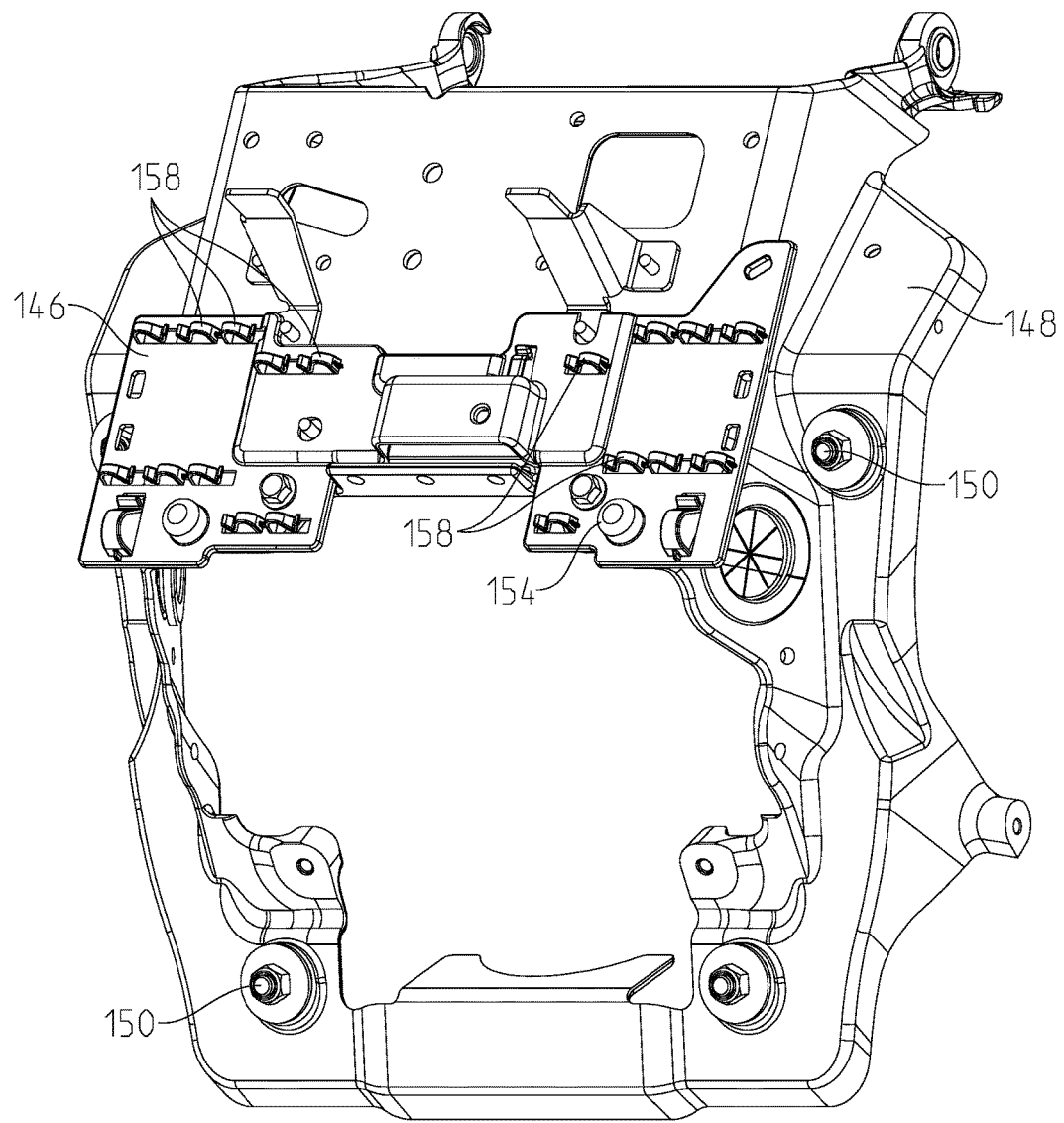
FIG. 15A is a left front view of a wiring harness and a support bracket positioned at the front portion of FIG. 14.
Figure 15B:
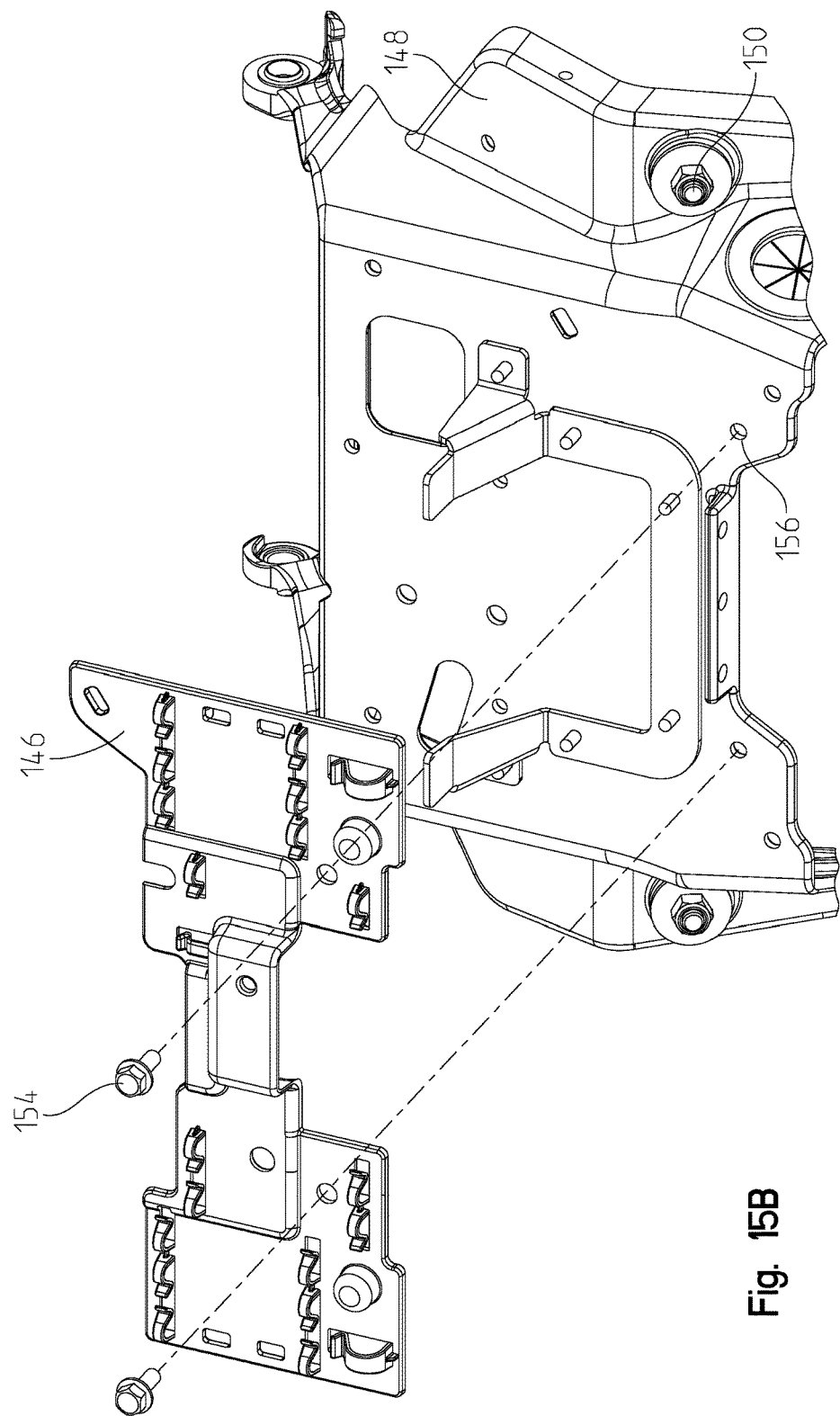
FIG. 15B is an exploded view of the wiring harness and support bracket of FIG. 14.

Referring to FIGS. 15A-16, a wiring harness bracket 146 of vehicle 2 is positioned forward of front display 70 and is configured to support electrical lines and wires of electrical system 220 of vehicle 2. For example, wiring harness bracket 146 may be electrically coupled to display 70, 72, 74, inputs 82, 84, 86, electrical connector 60, headlight 106, and other electrical components of vehicle 2. Wiring harness bracket 146 is coupled to a support member 148 with fasteners 154 which are received within apertures 156 on support member 148. Support member 148 is coupled to triple clamp assembly 104 though fasteners 150 received within apertures 152 on triple clamp assembly 104. As shown in FIGS. 15A and 15B, wiring harness bracket 146 includes a plurality of retaining members 158 which are configured to receive and organize electrical lines or wires such that at least a portion of the electrical wires on vehicle 2 are positioned on wiring harness bracket 146 to electrically couple with various electrical connectors and/or components of vehicle 2. As such, vehicle 2 may be manufactured with similar electrical routing and tension in the electrical lines via wiring harness bracket 146 rather than each vehicle 2 having a different routing configuration for the wiring.

Figure 17:
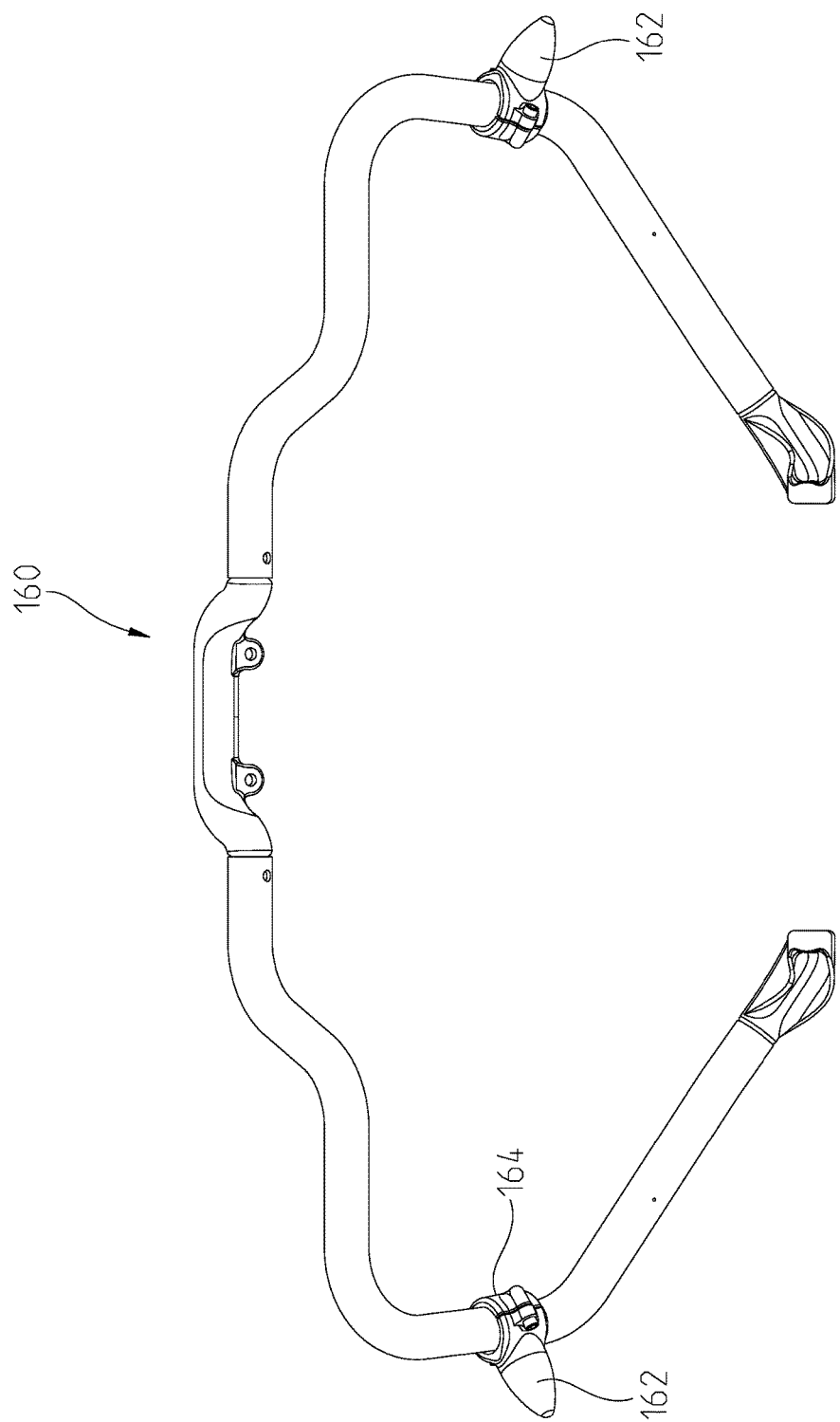
FIG. 17 is a rear perspective view of a highway bar of the vehicle of FIG. 1.
Figure 18:
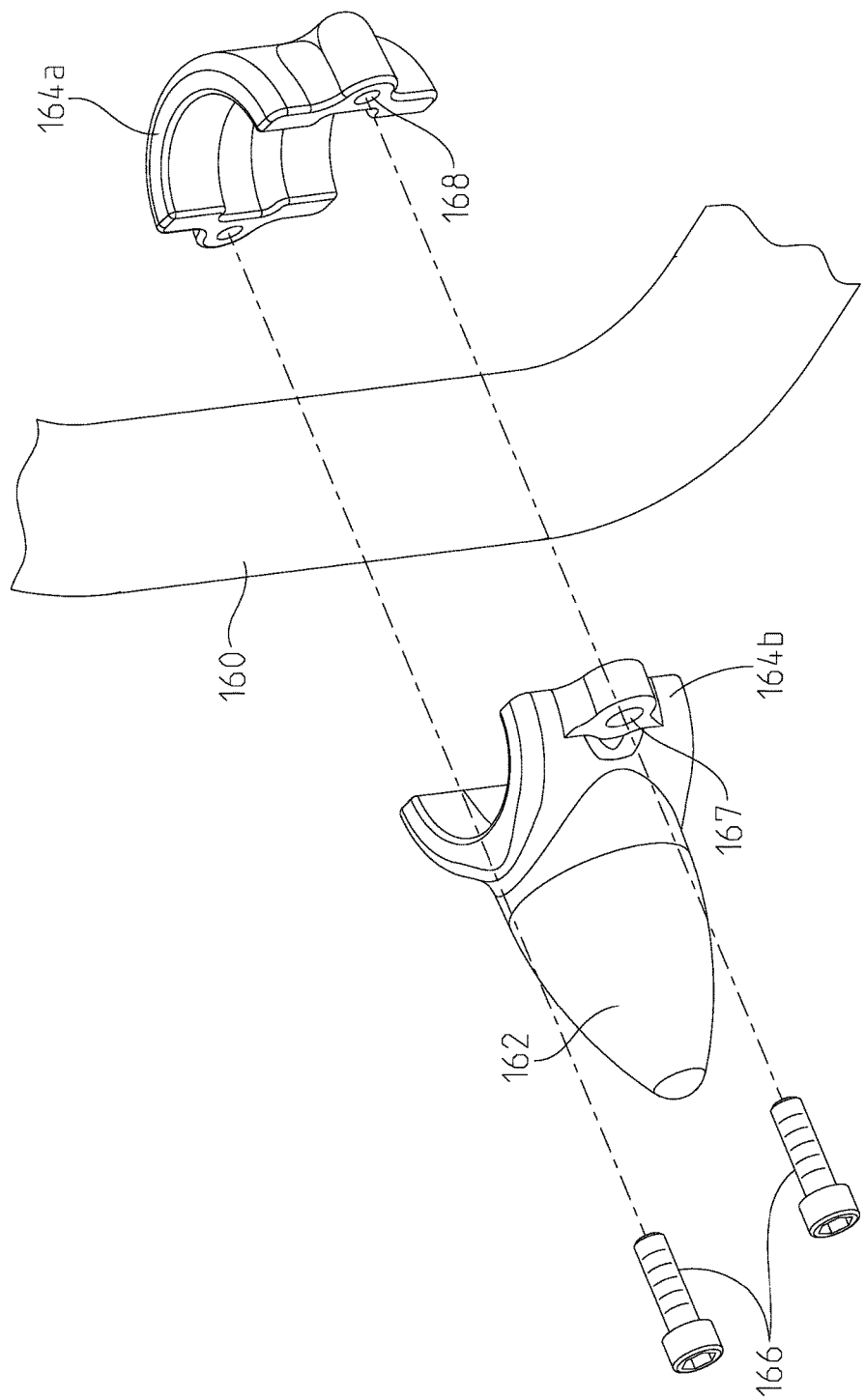
FIG. 18 is an exploded view of a foot peg coupled to the highway bar of FIG. 17.

As shown in FIGS. 17 and 18, in addition to positioning first display 70 at an ergonomic position for the rider, vehicle 2 also may include a highway bar 160 with nubs or foot pegs 162 extending laterally outward from highway bar 160. Highway bar 160 is coupled to a portion of frame assembly 8 and is positioned forward of engine 12 (FIG. 1). Foot pegs 162 are removably coupled to highway bar 160 with a coupler 164 having an inner member 164a and an outer member 164b coupled together with fasteners 166 which are received through openings 167 on outer member 164b and openings 168 on inner member 164a. As such, foot pegs 162 may be added or removed from highway bar 160 and the position of foot pegs 162 on highway bar 160 may be adjusted to accommodate the preferences of the operator. In one embodiment, foot pegs 162 may be integrally formed with outer member 164b. Illustratively, foot pegs 162 are rounded and define a tapered cone shape for supporting the operator's foot, however, foot pegs 162 may define any shape configured to support the operator's foot. By providing foot pegs 162 on highway bar 160, the operator has an additional place to put his/her feet during operation of vehicle 2. For example, foot pegs 162 are provided on vehicle 2 in addition to conventional foot pegs such that the operator has several options for where to position his/her feet during operation of vehicle 2. More particularly, foot pegs 162 may allow the operator to move his/her feet from a straight forward position to relax his/her feet and legs during operation of vehicle 2.

Figure 7:
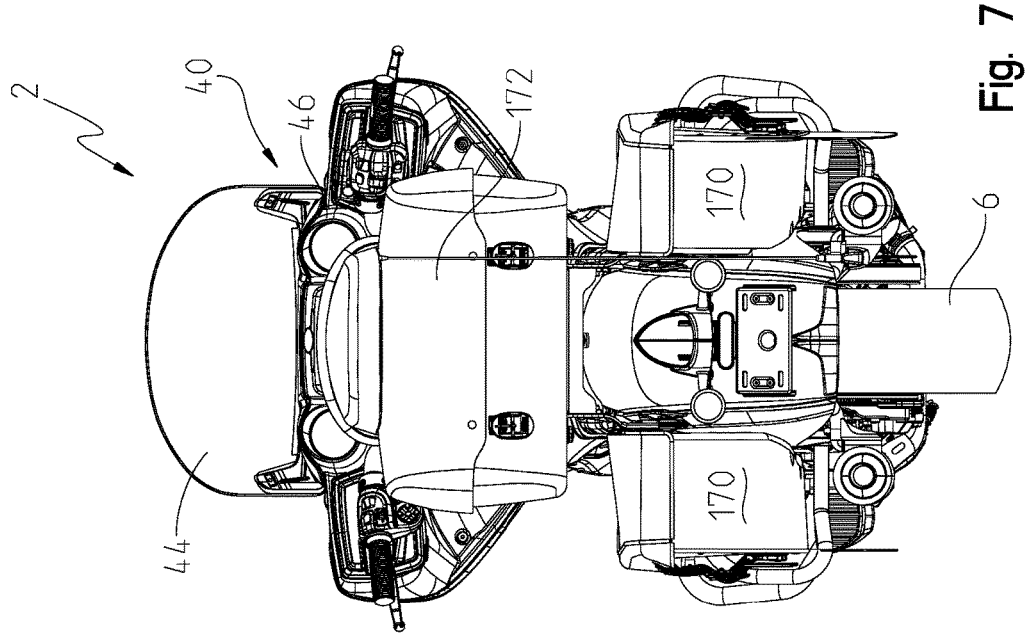
FIG. 7 is a rear view of the vehicle of FIG. 1.

Referring to FIGS. 19-24, a rear portion of vehicle 2 includes at least one saddle bag 170 and a trunk 172. Saddle bags 170 and trunk 172 may be removable accessories for vehicle 2 or may be permanently fixed to vehicle 2. Illustratively, as shown in FIGS. 1 and 7, saddle bags 170 flank rear ground-engaging member 6 and are positioned laterally outward from passenger seat 26. Saddle bags 170 include a storage portion 174 and a lid or cover 176 which rotates relative to storage portion 174 to expose or conceal any items positioned therein. Storage portion 174 and cover 176 may be comprised of any material, for example fabric, leather, or a hard plastic.

Figure 19:
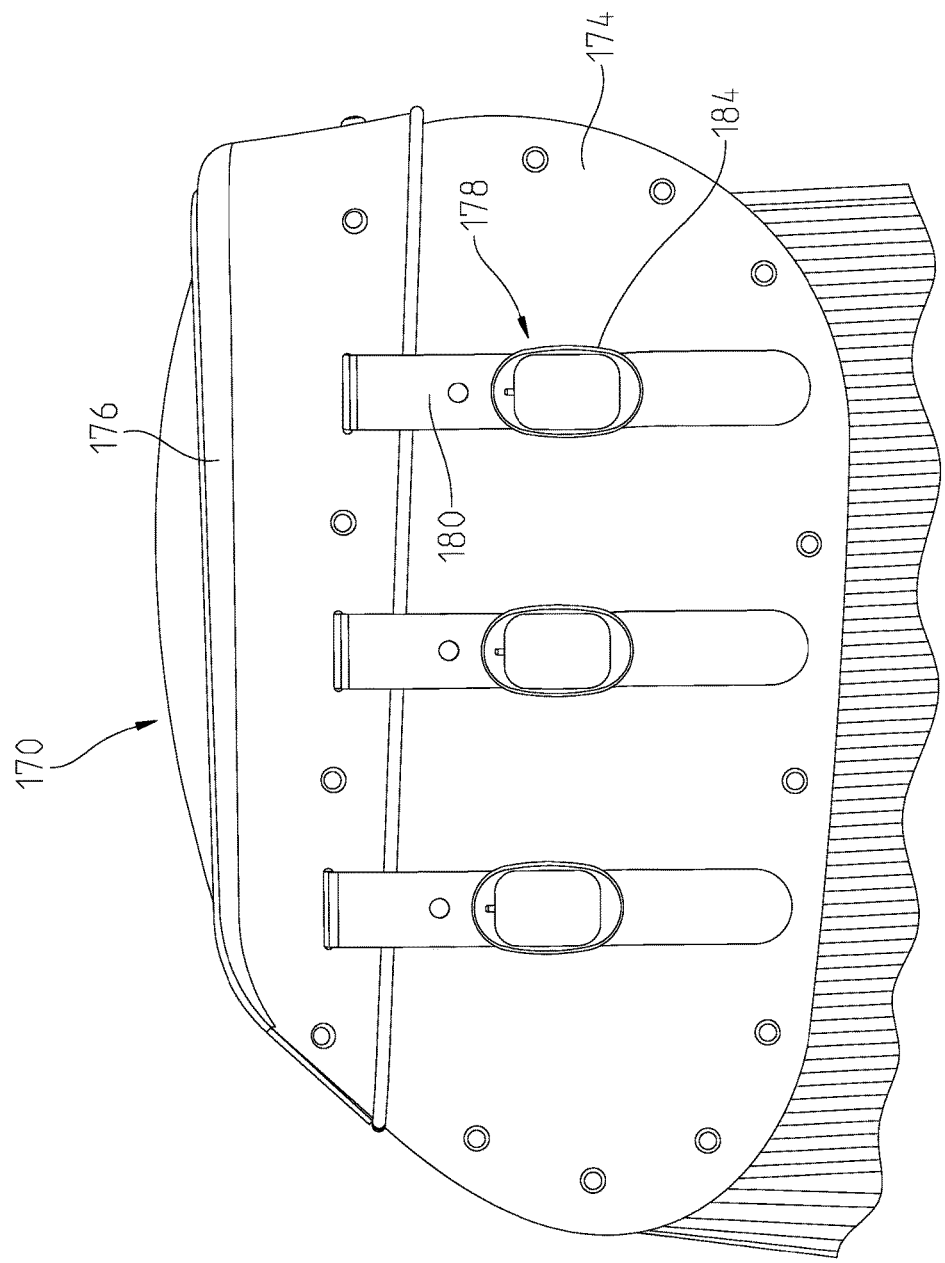
FIG. 19 is a side view of a saddle bag of the vehicle of FIG. 1.
Figure 20:
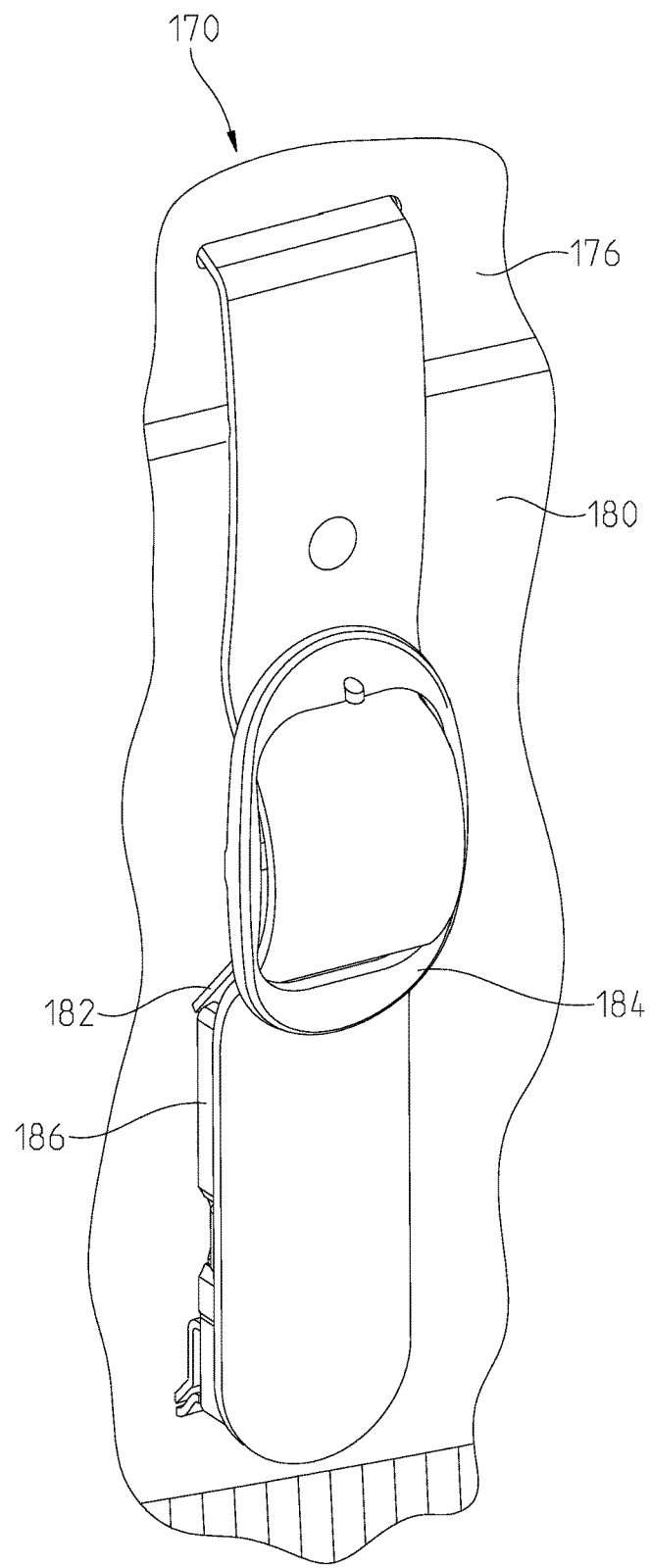
FIG. 20 is a left front perspective view of a latch assembly of the saddle bag of FIG. 19.
Figure 21:
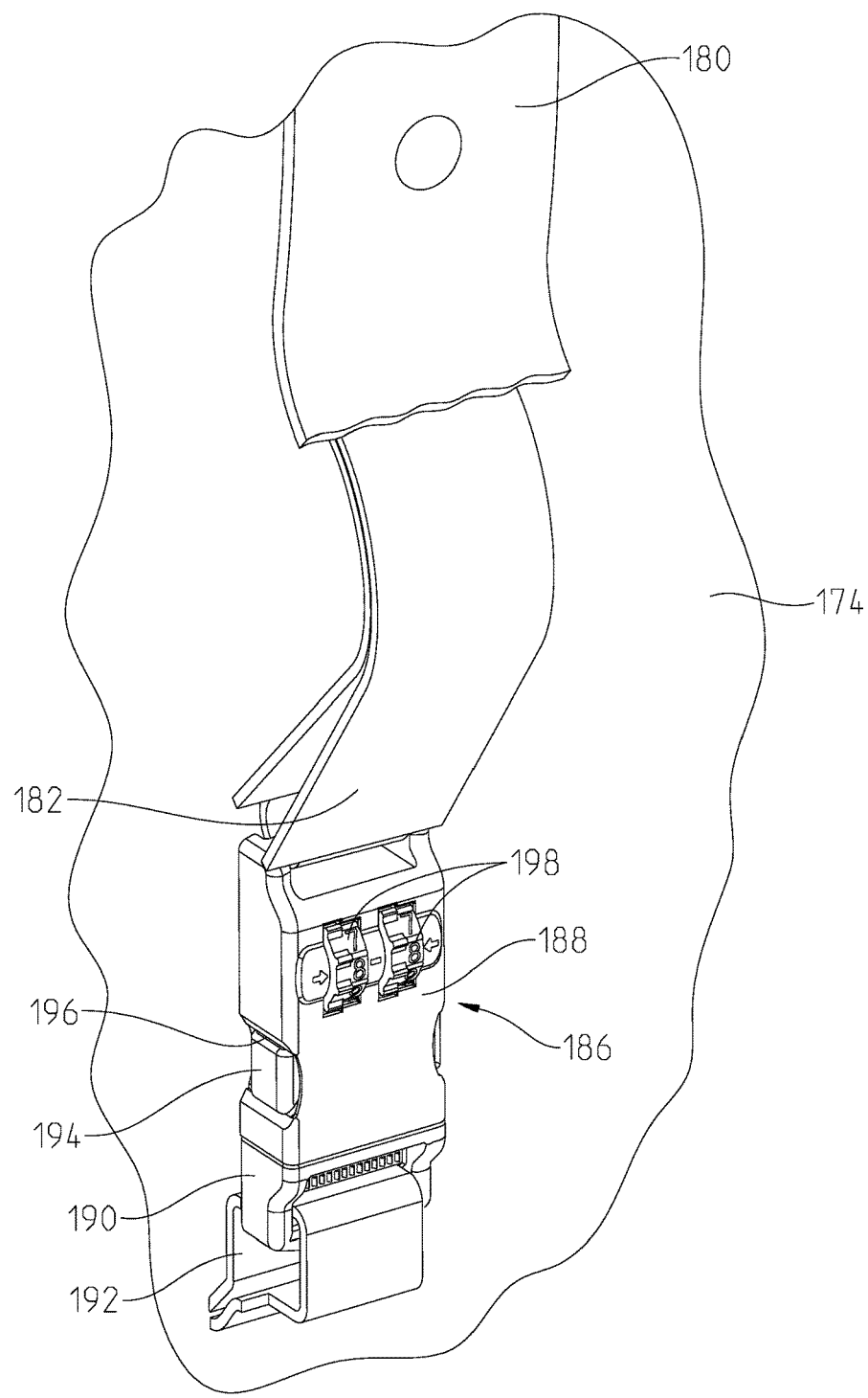
FIG. 21 is a left front perspective view of the latch assembly of FIG. 20.

As shown in FIGS. 19-21, cover 176 is coupled to storage portion 174 with at least one, and illustratively three, coupling members 178. Coupling members 178 may include an upper strap portion 180, a lower strap portion 182 (FIG. 21), a coupling member, illustratively a buckle 184, and a latch member, illustratively a combination lock 186 (FIG. 21). Illustratively, saddle bags 170 include two combination locks 186, however, alternative embodiments of saddle bags 170 may include more or less than two combination locks 186.

Referring to FIG. 21, combination lock 186 has an upper member 188 coupled to lower strap portion 182 and a lower member 190 coupled to storage portion 174 with a coupling member 192, such as a strap, bracket, clasp, or any other device configured to couple combination lock 186 to storage portion 174. Upper member 188 is releasably coupled to lower member 190 with tabs 194 on lower member 190 which are received within an opening 196 of upper member 188. Upper member 188 also may be locked with lower member 190 such that depressing tabs 194 does not release upper member 188 from lower member 190. More particularly, upper member 188 includes locking dials 198 which includes numbers 0-9 and are configured to be set to a specific number to unlock upper member 188 from lower member 190. For example, if the code for combination lock 186 is 88, as shown in FIG. 21, then dials 198 must be rotated to 88 to release upper member 188 from lower member 190. Whenever dials 198 are rotated to a number other than 88, then upper member 188 will not release from lower member 190. As such, saddle bags 170 may be locked to prevent someone from accessing any items within storage portion 174 when the operator is away from vehicle 2.

In one embodiment, a vehicle control unit (not shown) may be configured to automatically lock any of the storage containers of vehicle 2. For example, the vehicle control unit may automatically lock saddle bags 170 and/or lid 52 of storage container 50 on dash assembly 46 when vehicle 2 is parked or when windshield 44 is in the lowered position because windshield 44 is likely to be in the lowered position when vehicle 2 is not operating. In this embodiment, saddle bags 170 and/or storage container 50 may remain open when windshield 44 is in the raised position, unless the operator specifically locks saddle bags 170 and/or storage container 50. Additionally, saddle bags 170 and/or storage container 50 may be locked by a key, key fob, or any other mechanism.

Figure 22:
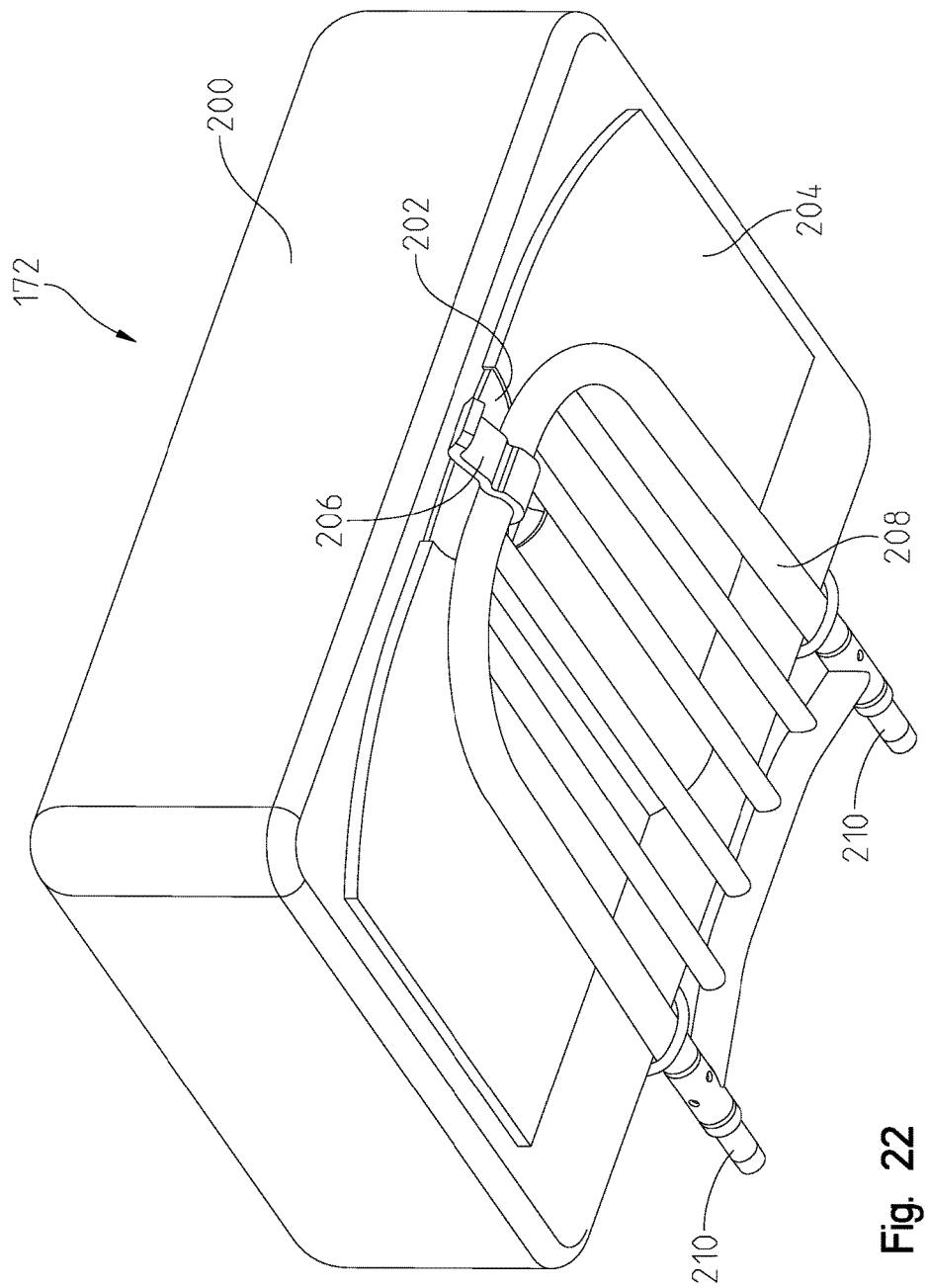
FIG. 22 is a left rear perspective view of a trunk assembly for the vehicle of FIG. 1.
Figure 23:
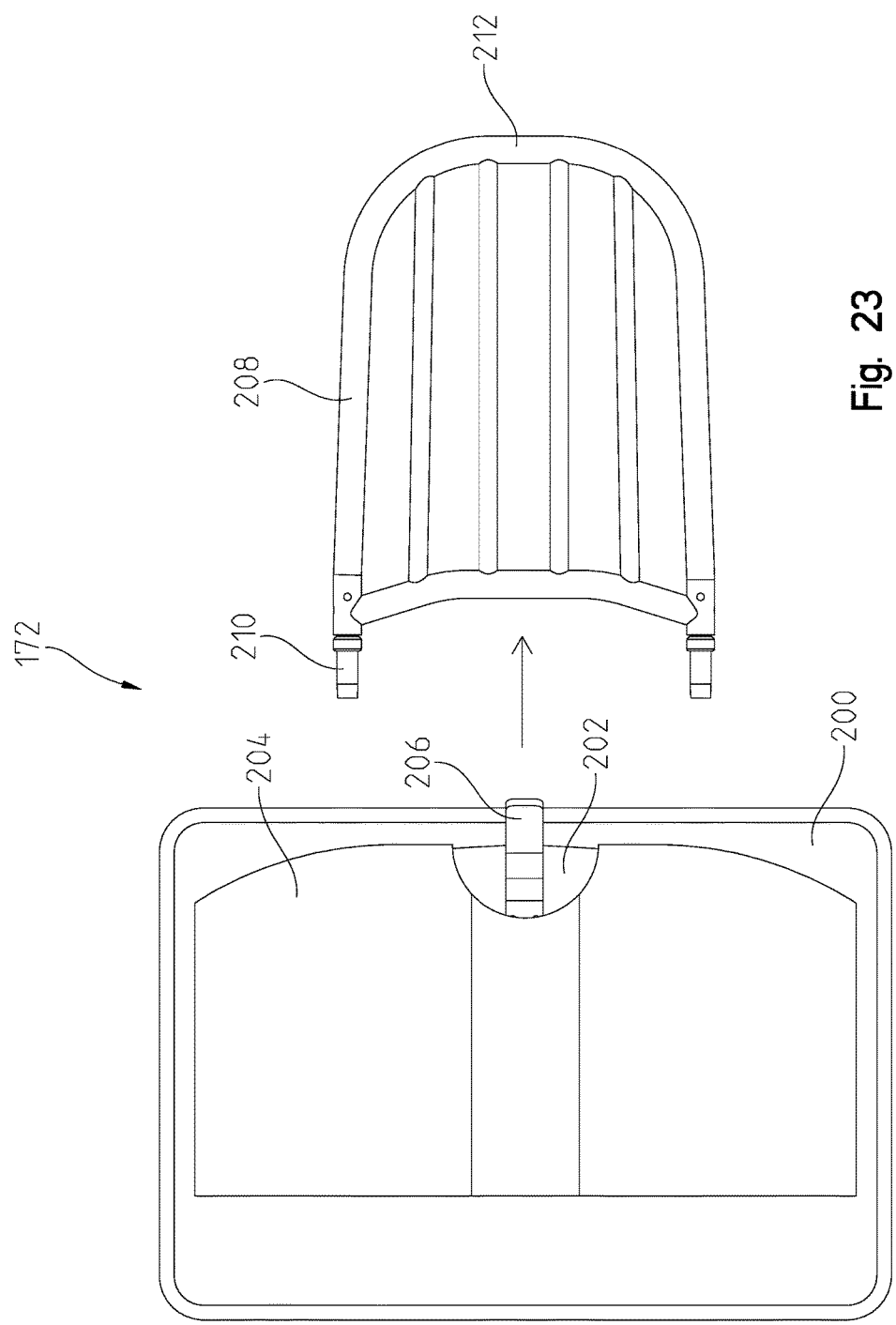
FIG. 23 is an exploded view of an underside of the trunk assembly of FIG. 22.
Figure 24:
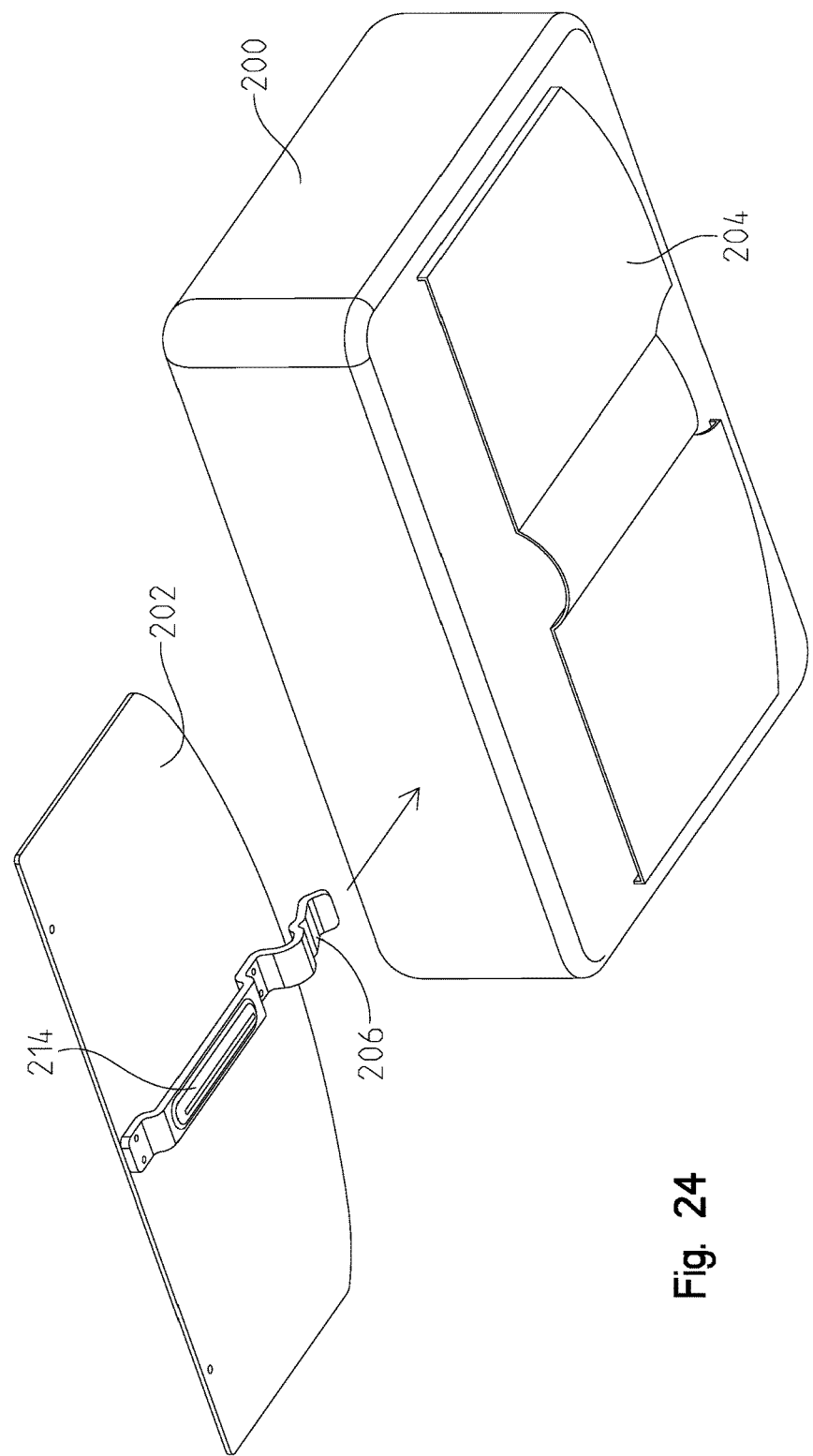
FIG. 24 is an exploded view of a support plate and a trunk of the trunk assembly of FIG. 22.

Referring to FIGS. 22-24, vehicle 2 also may include trunk 172 for additional storage. In one embodiment, trunk 172 may be removably coupled to vehicle 2 such that the operator can add or remove trunk 172 from vehicle 2 whenever necessary. Trunk 172 includes a storage container 200, a support plate 202 received within a sleeve or pocket 204 of storage container 200, and a trunk frame 208 which is coupled to support plate 202 with a latch member 206. Support plate 202 is received within sleeve 204 of storage container 200 and is configured to provide a flat lower surface of storage container 200 and couple storage container 200 to trunk frame 208. A front end of trunk frame 208 is coupled to trunk 172 with straps, a clip, a clamp, a latch, or any other type of coupling device. Illustratively, the front end of trunk frame 208 is removably coupled to trunk 172 with straps 215 (FIG. 22). As shown in FIG. 24, latch member 206 also may be coupled to support plate 202 with a bracket or other coupling member 214. Coupling member 214 may be secured to support plate 202 with conventional fasteners, such as rivets, bolts, welds, etc. Support plate 202 is configured to be received within sleeve 204 such that bracket 214 is concealed but latch member 206 extends through one end of sleeve 204 to couple with a rear end of trunk frame 208. Additionally, support plate 202 may include fasteners 216 which are received within fasteners 218 on sleeve 204 to further secure support plate 202 within sleeve 204 (FIG. 24). In one embodiment, fasteners 216 are female-type snaps and fasteners 218 are male-type snaps configured to receive a protrusion of the female-type snaps on support plate 202. Alternatively, fasteners 216, 218 may define other mechanisms for releasably coupling support plate 202 to sleeve 204, such as hook-and-loop fasteners or clips.

Trunk frame 208 is coupled to frame assembly 8 or another component of vehicle 2 at ends 210 of trunk frame 208. For example, ends 210 may be received within an opening of frame assembly 8 of vehicle 2. Additionally, latch member 206 is removably coupled to an outer extent 212 of trunk frame 208 such that trunk frame 208 is positioned below storage container 200, as shown in FIG. 22. As such, when the operator wants to remove storage container 200 from vehicle 2, the operator actuates latch member 206 to remove storage container 200 and support plate 202 from vehicle 2. However, trunk frame 208 may remain coupled to vehicle 2 when storage container 200 is removed or, alternatively, the operator also may remove trunk frame 208 from vehicle 2 when storage container 200 is removed.

In one embodiment, trunk 172 is configured to include interchangeable components such that a different storage container may be coupled to trunk frame 208 by merely coupling the corresponding support plate of the different storage container to trunk frame 208. Alternatively, different storage containers may include sleeves which also can receive support plate 202 such that a different storage container can be mounted to support plate 202 and trunk frame 208. Vehicle 2 also may be configured to support embodiments of a trunk disclosed in U.S. patent application Ser. No. 14/077,037, the complete disclosure of which is expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle having a longitudinal centerline, the vehicle comprising:
a plurality of ground-engaging members;
a seat supported by the plurality of ground-engaging members;
a fuel tank positioned adjacent the seat;
a steering assembly operably coupled to at least one of the ground-engaging members;
a front fairing operably coupled to at least a portion of the steering assembly; and
a display moveable with the steering assembly and intersecting the longitudinal centerline of the vehicle, wherein the display is positioned rearward of a vertical plane that intersects a front extent of the fuel tank, and wherein a horizontal plane that intersects an upper extent of the display is above a horizontal plane that intersects an upper extent of the front fairing.

2. The vehicle of claim 1, wherein the vehicle is a two-wheeled vehicle, the display is positioned rearward of a vertical plane that intersects a rear extent of the front fairing.

3. The vehicle of claim 1, wherein the display is positioned above a horizontal plane that intersects an upper extent of the fuel tank.

4. The vehicle of claim 1, wherein:
the vehicle is a two-wheeled vehicle,
the front fairing supports a head light, and
the display is positioned above a horizontal plane that intersects an upper extent of the head light.

5. The vehicle of claim 1, further comprising an engine, wherein the display is positioned rearward of a vertical plane that intersects a front extent of the engine.

6. The vehicle of claim 5, wherein the display is vertically aligned with a front cylinder of the engine.

7. The vehicle of claim 1, wherein:
the vehicle is a two-wheeled vehicle having a triple clamp assembly, and
the display is positioned such that a horizontal plane that intersects an upper extent of the display is above a horizontal plane that intersects an upper extent of the triple clamp assembly.

8. The vehicle of claim 7, wherein a horizontal plane that intersects a lower extent of the display is above the horizontal plane that intersects the upper extent of the triple clamp assembly.

9. The vehicle of claim 1, wherein:
the plurality of ground-engaging members includes a front ground-engaging member configured to rotate about a front axis of rotation and a rear ground-engaging member configured to rotate about a rear axis of rotation,
a wheel base is defined between the front and rear axes of rotation, and
the display is positioned rearward of a vertical plane that intersects the front axis of rotation by a distance of at least 30% of the wheel base.

10. The vehicle of claim 9, wherein:
a first vertical distance separates a horizontal plane that intersects the front axis of rotation from a horizontal plane that intersects a center point of the seat,
a second vertical distance separates the horizontal plane that intersects the front axis of rotation from a horizontal plane that intersects a center point of the display, and
the second vertical distance is twice the first vertical distance.

11. The vehicle of claim 1, wherein the steering assembly includes gripping portions configured to be received by a rider when operating the vehicle, and wherein a line extending between the gripping portions intersects the display.

12. The vehicle of claim 1, further comprising a visor coupled to an upper extent of the display and extending rearwardly from the display.

13. The vehicle of claim 12, further comprising a windshield assembly, wherein:

the visor couples to the upper extent of the display at a coupling position, and
a horizontal plane that intersects the coupling position intersects the windshield assembly at a position between an upper extent and a lower extent of the windshield assembly.

14. An open-air vehicle having a longitudinal axis, the vehicle comprising:
a plurality of ground-engaging members;
a drivetrain assembly operably coupled to the plurality of ground-engaging members and including an engine having at least one cylinder;
a seat supported by the ground-engaging members and configured to support a rider;
a steering assembly positioned longitudinally forward of the seat;
a front fairing operably coupled to at least a portion of the steering assembly; and
a dash assembly positioned adjacent a portion of the steering assembly and including a display having a plurality of pixels configured to change in response to an input, wherein:
the dash assembly is configured to move with the steering assembly,
the display is vertically aligned with the at least one cylinder of the engine, and
a horizontal plane that intersects an upper extent of the display is above a horizontal plane that intersects an upper extent of the front fairing.

15. The vehicle of claim 14, further comprising a fuel tank positioned vertically intermediate the display and the at least one cylinder of the engine, wherein the display is positioned rearward of a vertical plane that intersects a forward extent of the fuel tank.

16. The vehicle of claim 15, wherein the display is positioned about 6 inches to about 8 inches above an upper extent of the fuel tank.

17. The vehicle of claim 14, wherein the horizontal plane that intersects the upper extent of the front fairing intersects the display above a center point of the display.

18. The vehicle of claim 17, wherein the horizontal plane that intersects the upper extent of the front fairing intersects the display about 1 inch to about 3 inches above the center point of the display.

19. The vehicle of claim 14, wherein a lower extent of the display is positioned rearward of a vertical plane that intersects a rear extent of the front fairing.

20. An open-air vehicle having a longitudinal axis, the vehicle comprising:
a front ground-engaging member configured to rotate about a front axis of rotation;
a rear ground-engaging member configured to rotate about a rear axis of rotation, wherein a wheel base is defined between the front and rear axes of rotation;
a drivetrain assembly operably coupled to the plurality of ground-engaging members;
a seat supported by the ground-engaging members and adapted to support a rider;
a steering assembly positioned longitudinally forward of the seat;
a first storage container positioned forward of a vertical plane that intersects the display and a second storage container positioned rearward of the vertical plane that intersects the display; and
a dash assembly positioned adjacent a portion of the steering assembly and including a display having a plurality of pixels configured to change in response to an input, the dash assembly being configured to move with the steering assembly.

21. The vehicle of claim 20, wherein:
the vehicle is two-wheeled vehicle including a triple clamp assembly, and
the display is positioned rearward of a vertical plane that intersects a center of the triple clamp assembly by a longitudinal distance that is within a range of about 10% to about 16% of the wheel base.

22. The vehicle of claim 20, further comprising a front fairing, wherein the display is positioned rearward of a vertical plane that intersects a rear extent of the front fairing.

23. The vehicle of claim 20, further comprising a front fairing, wherein a center point of the display is vertically less than two inches below a horizontal plane that intersects an upper extent of the front fairing.

24. The vehicle of claim 20, wherein the dash assembly includes a visor positioned above the display.

25. The vehicle of claim 20, further comprising a fuel tank fluidly coupled to the drivetrain assembly, the fuel tank including at least one gauge and a visor positioned above the gauge.

26. The vehicle of claim 20, wherein the display is configured as a touch-screen display.

27. The vehicle of claim 20, wherein a vertical plane that intersects a center point of a bottom of the seat is separated from a vertical plane that intersects a center point of the display by a first longitudinal distance that provides access to the display for the rider when the rider is seated in an upright position on the seat.

28. The vehicle of claim 27, wherein the first longitudinal distance is within a range of about one-third to about one-half of the wheel base.

29. The vehicle of claim 20, further comprising a front fairing, wherein a horizontal plane that intersects an upper extent of the display is above a horizontal plane that intersects an upper extent of the front fairing.

30. The vehicle of claim 29, wherein a center point of the display is vertically less than two inches below the horizontal plane that intersects the upper extent of the front fairing.

31. A vehicle having a longitudinal centerline comprising:
a plurality of ground-engaging members;
a seat supported by the plurality of ground-engaging members;
a fuel tank positioned adjacent the seat;
a steering assembly operably coupled to at least one of the ground-engaging members;
a front fairing operably coupled to at least a portion of the steering assembly; and
a display moveable with the steering assembly and intersecting the longitudinal centerline of the vehicle, and the display is positioned rearward of a front plane of the fuel tank, wherein a horizontal plane extending from an upper extent of the display extends vertically above an upper extent of the front fairing,
the vehicle further comprising a visor coupled to an upper extent of the display and extending rearwardly from the display.

32. The vehicle of claim 31, further comprising a windshield assembly, wherein the visor couples to the upper extent of the display at a coupling position, and wherein a horizontal plane extending from the coupling position intersects the windshield assembly at a position between an upper end and a lower end of the windshield assembly.

33. An open-air vehicle having a longitudinal axis, comprising:

a front ground-engaging member configured to rotate about a front axis of rotation;

a rear ground-engaging member configured to rotate about a rear axis of rotation, wherein a wheel base is defined between the front and rear axes of rotation;

a drivetrain assembly operably coupled to the plurality of ground-engaging members;

a seat supported by the ground-engaging members and adapted to support a rider;

a steering assembly positioned longitudinally forward of the seat; and a dash assembly positioned adjacent a portion of the steering assembly and including a display having a plurality of pixels configured to change in response to an input, the dash assembly being configured to move with the steering assembly, and a first longitudinal distance from a center of the seat to the display being at least 30% of the wheel base, the vehicle further comprising a first storage container positioned forward of the display and a second storage container positioned rearward of the display.

* * * * *